US005483111A

United States Patent [19]
Kuznetsov

[11] Patent Number: 5,483,111
[45] Date of Patent: Jan. 9, 1996

[54] METHOD AND APPARATUS FOR ELIMINATION OF THE EXIT-EDGE EFFECT IN HIGH SPEED LINEAR INDUCTION MACHINES FOR MAGLEV PROPULSION SYSTEMS

[75] Inventor: Stephen B. Kuznetsov, Rockville, Md.

[73] Assignee: Power Superconductor Applications Corp., Pittsburgh, Pa.

[21] Appl. No.: 217,443

[22] Filed: Mar. 23, 1994

[51] Int. Cl.[6] ................................................ H02K 41/00
[52] U.S. Cl. ............................ 310/12; 318/135; 104/292
[58] Field of Search ................................. 310/12, 13, 14; 318/135; 104/290, 292, 293

[56] References Cited

U.S. PATENT DOCUMENTS

| | | | |
|---|---|---|---|
| 4,039,922 | 8/1977 | Chirgwin | 363/9 |
| 4,896,063 | 1/1990 | Roberts | 310/68 R |
| 4,900,992 | 2/1990 | Sekizawa et al. | 318/135 |
| 4,959,573 | 9/1990 | Roberts | 310/68 R |

Primary Examiner—Steven L. Stephan
Assistant Examiner—Judson H. Jones
Attorney, Agent, or Firm—Ansel M. Schwartz

[57] ABSTRACT

An alternating current electrical machine construction in which a primary winding is modified to create multiple transient electromagnetic conditions for example by having at least two distinct values of pole pitch. In a linear induction motor, a first pole-pitch portion (88, 90 and 92) is followed by a second portion (82, 84 and 86) of shorter pole-pitch. When an inductively coupled solid reaction rail passes from first to second reaction rail currents "memorized" from the first, propulsion, section cause current in the second, recovery section. This current can be of unity or leading power factor. Appropriate winding design permits the operation of the machine using an inverter (LCIA) without making provision for external reactive power supply. Part of the machine winding, the recovery section, functions as an asynchronous condenser (SAC) to compensate the reactive power components due to magnetic leakage flux. In a linear machine the winding modification can provide transient creating pole or part-pole windings controlling the quadrature flux component.

21 Claims, 28 Drawing Sheets

PRIOR ART

Phase C Primary Winding Layout

METHOD AND APPARATUS FOR ELIMINATION OF THE EXIT-EDGE EFFECT IN HIGH SPEED LINEAR INDUCTION MACHINES FOR MAGLEV PROPULSION SYSTEMS

FIELD OF THE INVENTION

This invention relates to electrical propulsion machines, and more particularly to brushless high speed linear induction machines for magnetically levitated (Maglev) vehicle propulsion used at speeds in the range of 200–350 mph.

BACKGROUND OF THE INVENTION

In electrical propulsion machines energy is wasted in various ways including friction, winding resistance and eddy currents. Such losses can be minimized by careful design of the mechanical aspects of the machine and by correct choice of constructional materials. There is however another defect which is related more to the nature of the electrical effects by which the machine operates, especially when at very high speeds. This defect is identified with a quantity called the power factor. The current and voltage in the machine are moved out of phase with one another resulting in an "imaginary" or reactive power component of the electrical energy involved. This reactive component cannot produce a useful output from the machine so it reduces the "real" power available in the machine, reducing the efficiency of both the machine and the associated electrical transmission path and increasing the construction and operating costs of both.

Despite these disadvantages the simple, robust construction of linear induction machines (LIM) has led to their widespread use as main propulsion drives with the acceptance of this cost penalty. Clearly with increasing material and manufacturing costs this penalty is less acceptable.

Induction motors are generally cylindrical and symmetrical but linear motors have a flat geometry for both stator and moving members termed primary and secondary respectively. Such machines have an "open magnetic circuit". The partial stator introduces asymmetry into the electrical and magnetic states which is distinct from the symmetry of a conventional cylindrical induction machine. A conventional linear induction motor has a lagging power factor with a stator current pattern travelling at synchronous speed and induces (printed) in the rotor an identical pattern also travelling at synchronous speed but displaced in the direction of motion in dependence on the ratio of load current to magnetizing current. (This ratio is the magnetic Reynolds number or "Goodness Factor" of the machine and should be as high as possible.)

In the paper "The Asynchronous Condenser: A Brushless Adjustable Power Factor Induction Machine", *IEEE Transactions of Power Apparatus*, Vol. PAS-99, pp. 2242–2432, 1980, E. R. Laithwaite and S. B. Kuznetsov show the occurrence of a second induced current pattern in the secondary due to transients on the entry of unmagnetized secondary conductive material under the leading edge of the stator and identical to the stator current pattern but travelling at vehicle speed. FIG. 1, which is similar to FIG. 1 of the first of the above references, illustrates the analysis on p. 2242 of this reference. FIG. 1 is a plot of flux in the electromagnetic airgap against distance denoted "s" along the gap normalized as radians in terms of pole pitch and slip to be independent of any particular machine condition. The flux level marked ECM or 2 is that of the steady-state in-phase flux of an "equivalent conventional machine". The two flux components drift in and out of phase during movement of the secondary conductor producing the Bp label 4 and Bq label 6 curves shown in FIG. 1. It should be emphasized that these curves relate to a perfect machine, i.e. one requiring zero magnetizing currents and having zero magnetic leakage. The area under the Bp curve is a measure of the useful power output of the machine as a motor.

The maximum machine efficiency occurs at $s/p=\pi$ on the distance axis where s=distance along stator-longitudinal and p=pole-pitch. The area quadrants I and IV between Bp and ECM labeled 8 and 10, respectively, represents a reduction in electrical real-power losses in comparison with a conventional machine. The maximum terminal power factor occurs at a slip times distance product of $2\pi$ and based on the equal graph areas on either side of the axis appears to be unity. (The ECM level of Bq is zero, i.e. the distance axis.)

Prior to the slip-distance product reaching $2\pi$ the airgap reactive power which is the integral of the Bq waveform is always lagging and at $2\pi$ the air gap reactive power is zero, and consequently, the power factor is unity. The second current pattern leads to higher secondary conductor losses than in a cylindrical machine, indicated by the area above the Bp curve but below ECM. Also on exit from the stator "back thrust" arises when the magnetized reaction rail on the maglev guideway continues to move from beneath the final energized stator blocks, again leading to transients which result in further losses. This is termed "exit-edge" loss in an uncompensated linear motor. In particular a "perfect" LIM, i.e. having no leakage flux and drawing no magnetizing current would still draw reactive volt amperes from the supply whenever the region between the Bq curve and the axis has more positive area than negative area, resulting in lower, i.e. poorer, power factor.

Reactive power, Q, is the product of the apparent power, s, with the sine of the phase angle θ. The amount of real power, p, is indicated by the mathematical product of the power factor (expressed as cos θ) and the apparent powers or kVA input.

$$p = s(\cos \theta)$$
$$Q = \sqrt{s^2 - p^2}$$
$$\text{Power Factor} = \frac{p}{\sqrt{p^2 + Q^2}}$$

This power factor is unity when reactive power is not being drawn. When reactive power is drawn the power factor is less than unity. The higher the proportion of reactive power the lower the power factor. Inductive loads, typically induction motors, have a lagging power factor between 1.0 and zero while capacitive loads, which are rare, have a leading power factor between 1.0 and zero and can offset inductive loads on a common supply. Accordingly the LIM, and open magnetic machines in general, are at a disadvantage, apart from applications where other properties outweigh this poor power factor disadvantage.

Reference has been made to stator and reaction rails above but as the terms are not always clearly identifiable with machine parts the terms primary and secondary will be used respectively to identify that machine part connected to a power supply and that part coupled to the primary by electromagnetic effects. Where the term "winding" is used this includes a solid electrical element of the type found in some linear motors. The term machine extends to both generators and motors.

SUMMARY OF THE INVENTION

It is an object of the invention to provide an electrical machine in which the electromagnetic transient states exist but at the terminals of the LIM, it has a power factor equal to that of an equivalent machine and the described invention eliminates the classical exit edge effect problem in the respect of producing no stray electromagnetic drag on the propulsion system.

According to the invention there is provided an alternating current electrical machine having a first winding and a second winding both of electrically conductive material and supported for relative motion with a magnetic flux-permeable gap between them, one winding being arranged to create and maintain along the gap at least one transient to different electrical and/or magnetic field conditions across the gap, without requiring a change in the frequency of the alternating current applied to the machine, the arrangement being such that in operation with said relative motion of the windings the transient to different conditions results in a change of effective field speed along said gap and the first and second windings thereby interact to produce in the one winding negative reactive volt amperes or negative reactive power (i.e. alternating current of the applied frequency at a leading power factor). The negative reactive power provides the basis for compensating within the same machine and structure, reactive losses which are classified as drawing positive reactive power.

Conveniently in a brushless electrical machine having a wound, uniformly slotted, stator and a uniform reaction rail the stator winding includes one part wound to one pole pitch and by this invention another stator segment wound to a shorter pole pitch to provide in operation a stator field pattern decelerating in specific longitudinal zones with respect to the reaction rail when moving steadily by a forward traveling magnetic field from the longer towards the shorter pole pitch past that part of the stator. In this arrangement the alternating field from the energized one stator part mirrored onto the reaction-rail excites a reactive current in the other, shorter pole pitch, stator part at a phase advanced with respect to that of the energized one part.

A second method: Modifications of the primary winding can provide a modified phase relation between adjacent poles for the purpose of creating negative reactive volt-amperes among selected pole groups within the main winding, thereby improving the terminal power factor.

A third method: The production of negative reactive volt amperes can be enhanced by changing the number of turns or magnetomotive force (MMF) per coil in the winding to produce space transients in the MMF distribution causing multiple coils in the primary to operate at leading power factor. This technique may be applied to both primary and secondary electrical circuits.

Fourth method: The modification of the pole phase relation and/or pitch can be achieved by a fixed winding form. The phase angle modification can also be achieved by control of the quadrature flux component of one or more transient-creating pole or part-pole primary windings spaced along the stator of a linear machine to actively control the effective width of a region of transient electromagnetic conditions.

Advantageously there is provided an electrical propulsion or drive system including such an electrical machine providing therein an asynchronous condenser winding arranged to recover reactive power existing at the exit-edge region of the machine during the operation of the machine, thereby improving the power factor of the machine. The system may include a solid-state inverter to supply the machine with alternating current at a fixed or variable frequency, the asynchronous condenser producing a local source of leading reactive power despite the inability of the inverter to provide reactive power. The system may be arranged so that the asynchronous condenser winding provides a filter for unwanted current harmonics, generated by said inverter or solid-state power electronics.

BRIEF DESCRIPTION OF THE DRAWINGS

In the accompanying drawings, the preferred embodiment of the invention and preferred methods of practicing the invention are illustrated in which.

DESCRIPTION OF THE PREFERRED EMBODIMENT

Figure 7A:
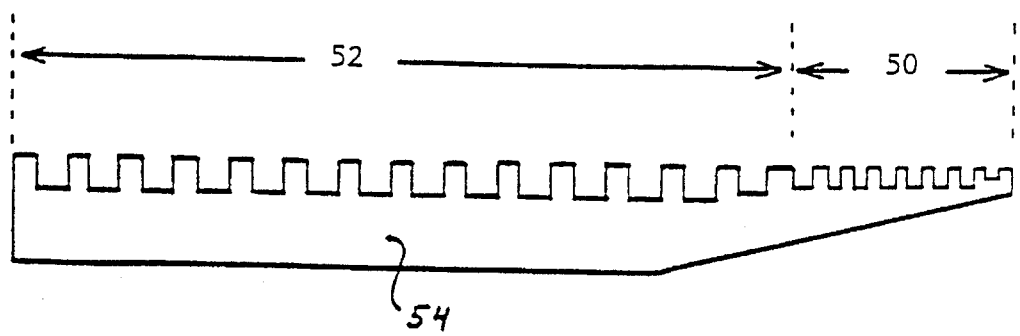
FIGS. 7a, 7b and 7c show constructional (7a) and circuit (7b) and (7c) details of a variable speed arrangement embodying the invention.

Referring now to the drawings wherein like reference numerals refer to similar or identical parts throughout the several views, and more specifically to FIG. 7a thereof, there is shown a stator for a linear induction motor having a reaction rail which is backed by a flux member. The stator comprises a first slot portion 52 of uniform pitch made of a constant iron section which provides an electromagnetic flux return path and source of primary excitation. The stator also comprises a second slot portion 50 having a shorter uniform pitch than the first slot portion 52. The second slot portion 50 is integrally connected to the first slot portion 52 and made of a reduced iron section extending from the constant iron section of the first slot portion 52 so exit-edge loss is eliminated.

The invention will be described as applied to a single-sided linear induction motor. This machine form is not necessarily a preferred embodiment but is a convenient form of operating and analyzing the invention. As described below the invention is applicable to various machine forms such as double-sided LIMs and the exact machine form is not part of the invention.

Figure 2:
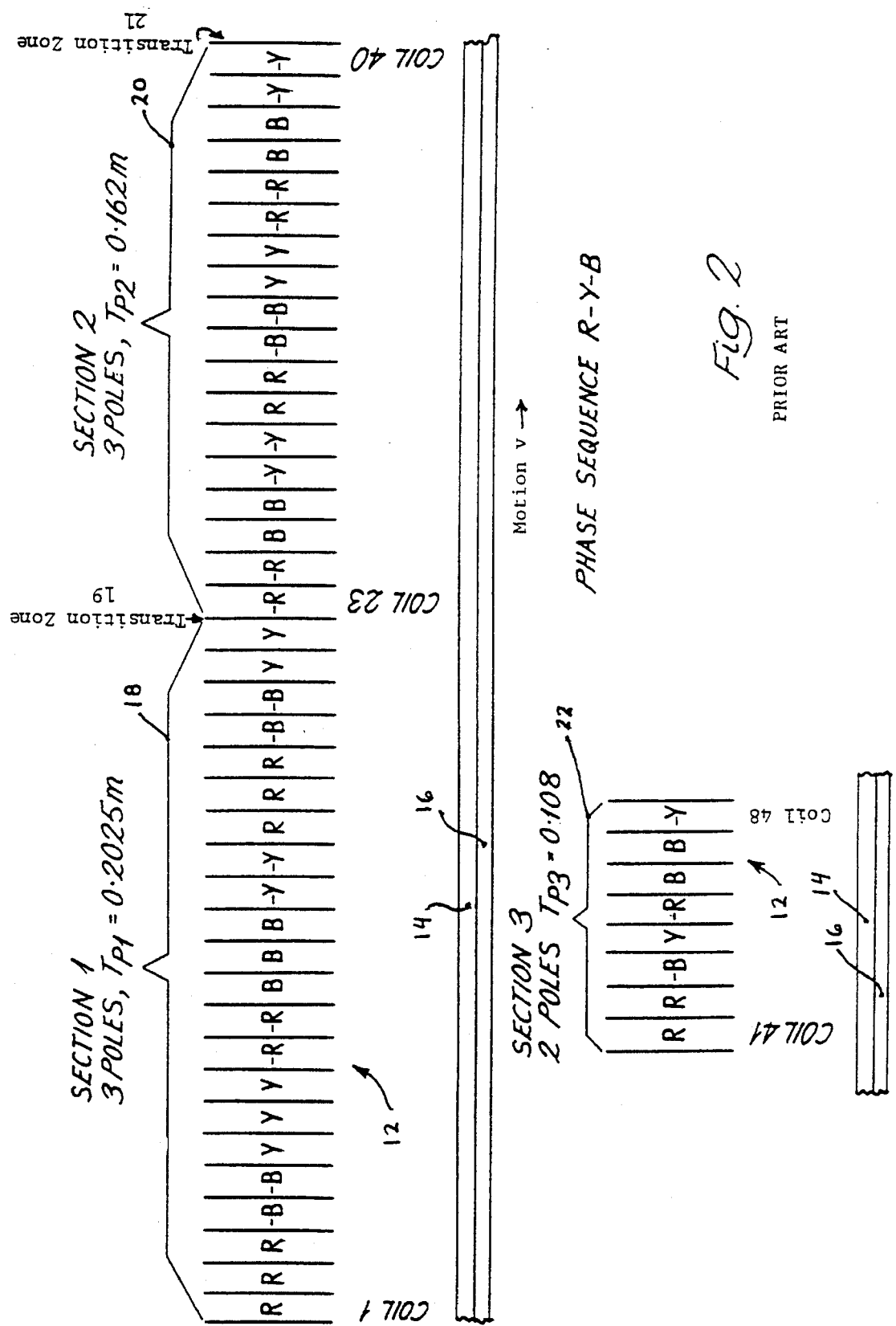
FIG. 2 shows a primary winding layout according to the scientific work reported in the Transactions of the IEEE on Power Apparatus & Systems, Vol. PAS-99, p. 2423, 1980, for a primary (stator) of a linear induction motor.

FIG. 2 shows the winding layout of a stator label 12 for a short-primary (stator) single-sided linear induction motor having a secondary (reaction rail) 14 of a high conductivity material such as aluminum, copper or brass and backed by a ferromagnetic flux-return member 16. The aluminum rail may be tungsten inert gas welded to ensure electrical continuity and prevent rotor induced transients. The stator and rail are both shown symbolically in FIG. 2 and could be of several suitable constructional forms.

In the preferred embodiment of the apparatus, for exemplary purposes, the stator block is 4½ feet (1.46 m) long and has 54 slots 14.3 mm wide by 38.1 mm deep on a 27 mm pitch. 48 Coils with 12 turns per coil were wound on to the stator and connected as shown in FIG. 2. The connection provides three different field speeds when energized with single-frequency 3-phase supply in the sequence R-Y-B. The phase rotation is indicated in FIG. 2 by the respective letters R, Y and B. In the winding coils 1 to 22, section one 18 provide three poles at pole pitch $T_{p1}$ of 0.2025 m; coils 23 to 40, section two 20 also provides three poles but at a pitch $T_{p2}$ of 0.162 m and coils 41 to 48 of section three 22 provide two poles at a pitch $T_{p3}$ of 0.108 m.

For a given energization frequency the field speed of section two 20 is 80% of that of section one 18 while for section three 22 it is 53.3% of that of section one 18. The decelerating field pattern over a limited and controlled motor segment is a feature of one aspect of the invention. However, in isolation, a decelerating field pattern does not produce a net negative reactive power for the machine. As the slip varies, the compensating and VAR generation effect of sections two and three will change, including variations between negative and positive reactive power flow.

Thus by way of example at a slip of 0.5 per unit for section one 18 the construction produces a slip of 0.375 per unit for section two 20 and 0.062 per unit for section three 22 all three sections giving some forward thrust to the rail. However at a slip of 0.25 per unit for section one 18 the slip of section two 20 is apparently +0.062 per unit and for section three 22 is apparently negative 0.406 per unit, i.e. section three 22 is a power generator, according to conventional machine theory. This negative slip should normally produce a drag component of thrust.

Figure 1:
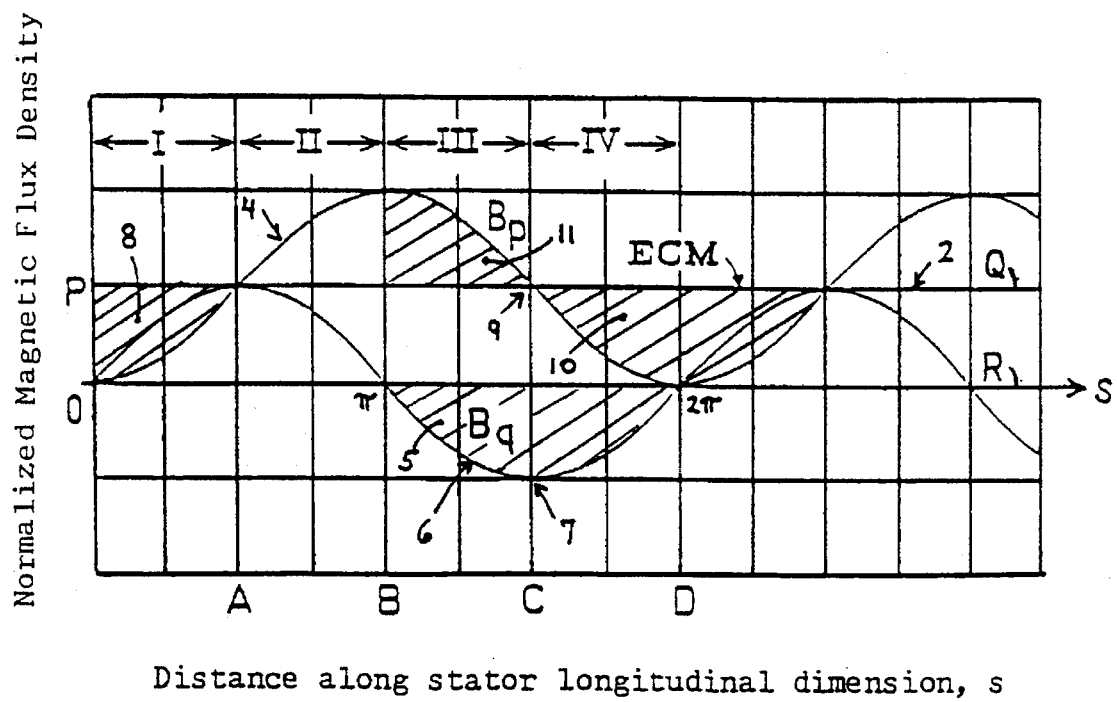
FIG. 1 is a graph relating to an explanation of effects already observed in electric induction machines of short-stator construction or asymmetrical primary construction.

However it must be understood that the whole of the motor pole surface is operating under transient conditions at all times. Thus it must not be assumed that an apparent negative slip, say for section three 22 implies a reversed thrust. It is precisely this combination of conditions and slip that accumulation of leading reactive volt amperes begins, substantially without loss of thrust. The effect of the machine structure according to the invention that is achieved can be represented on FIG. 1. Instead of the continuously repeating cycle of $B_p$ and $B_q$ flux values known hitherto, the in-phase flux $B_p$ 4 can be held at the ECM level value, 2 and quadrature flux $B_q$ 6 at the negative peak value 7. The cyclic curves then become horizontal lines at these values points 7 and 9 indicating the action of the invention in changing the nature of machine operation. These lines also indicate the production of useful power (between $B_p$ and the axis) area 11 and the accumulation of leading reactive volt amperes (beneath the axis down to $B_q$) area 5. This continuous recovery of leading reactive power is an important advantage and hitherto unobtainable action which permits the offsetting of the lagging reactive power of the propulsion portion of the machine, and hence terminal power factor magnetic compensation.

The machine described was tested with all coils in series connection and energized at variable frequencies from 50 to 70 Hz. Sections two 20 and three 22 can be considered as forming a generator of reactive volt amperes (VAR), i.e. out-of-phase, which operates without significant braking thrust, while section one 18 provides propulsive thrust drawing power from the supply at lagging power factor.

Figure 3:
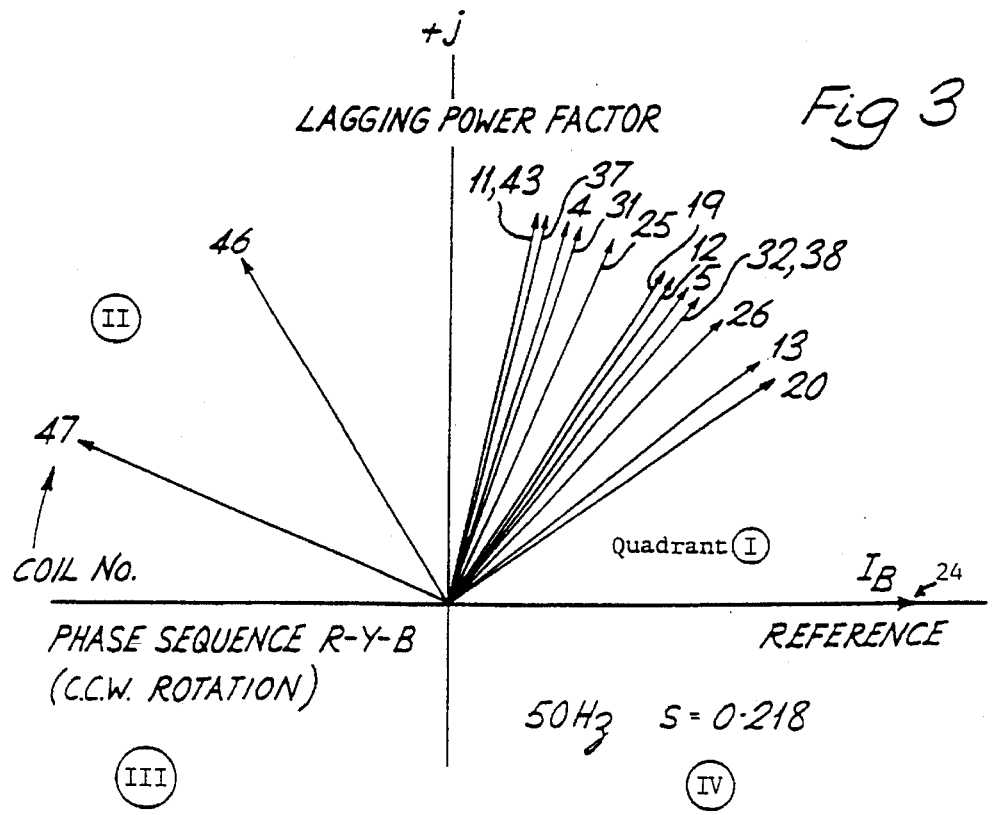
FIG. 3 shows prior art experimental data taken in the laboratory of coil voltage phase angles for some coils of one phase of the stator in FIG. 2.

In the experimental machine, each stator tooth, i.e. within each coil, had a search coil to permit measurement of tooth flux at slot pitch resolution. The search coils were in 0.5 mm grooves in the center of each tooth face. FIG. 3 shows with prior art a plot of coil voltage phase angles for the B phase at 50 Hz and 0.218 per unit slip with current as the phase zero angle reference, shown as label 24. The electrical phase angles range from 28° to 156°. However none of the coils actually had a leading power factor, because all had equal ampere turns, all the coils being similar. This data was reported in 1980 and represents the prior art in not being able to control the induced phase angles to be more uniform or exclusively lumped into the quadrants III or IV.

Figure 4:
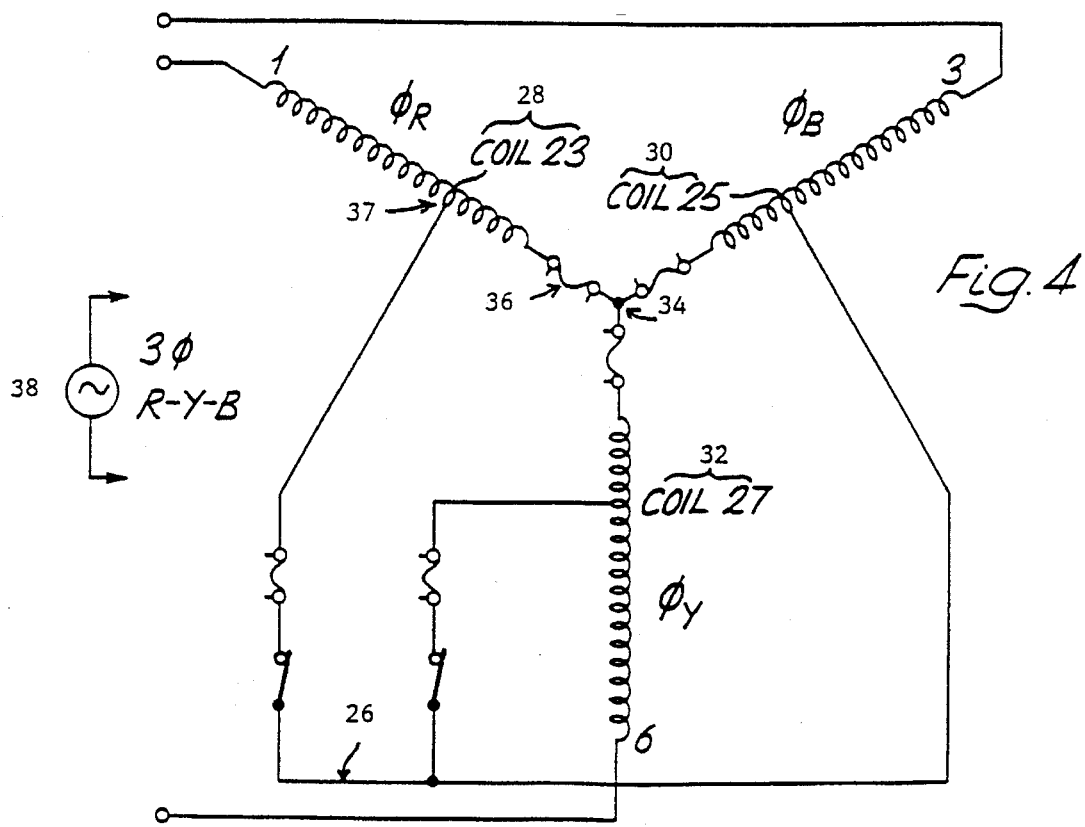
FIG. 4 shows a further experimental winding layout previously reported by the inventor and relevant to the changes to the described invention.

To permit an improvement over prior art, an alternate winding arrangement for sections two 20 and three 22 a shunting loop 26 of virtually zero impedance was applied as shown in FIG. 4. This was previously reported in Chapter 2 of the Doctoral Dissertation of the Inventor titled "Brushless Asynchronous Induction Machines with Leading VAR Capability" and published in 1984, incorporated by reference. Coils 23, (28) 25 (30) and 27 (32) of FIG. 2 were each connected directly to a floating star point 34 switches, 36 being included to enable the loop to be opened and closed.

The machine was then operated with the same excitation and line current as above from source 38. The light running speed was higher, the overall power factor was improved by 30% taking account of the recoverable reactive power and, most importantly, 9 coils in winding section two showed leading power factors on measurements with two independent devices, such as electronic phase meter and a moving coil VAR meter to eliminate the possibility of a spurious measurement.

Figure 5A:
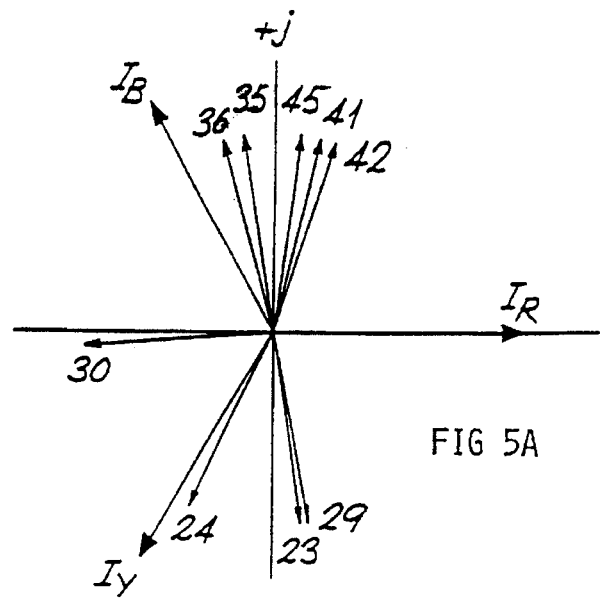
FIGS. 5a, 5b and 5c show experimental data taken in the laboratory of selected coils of all phases of the stator of FIG. 2, but in a modified connection arrangement.
Figure 5B:
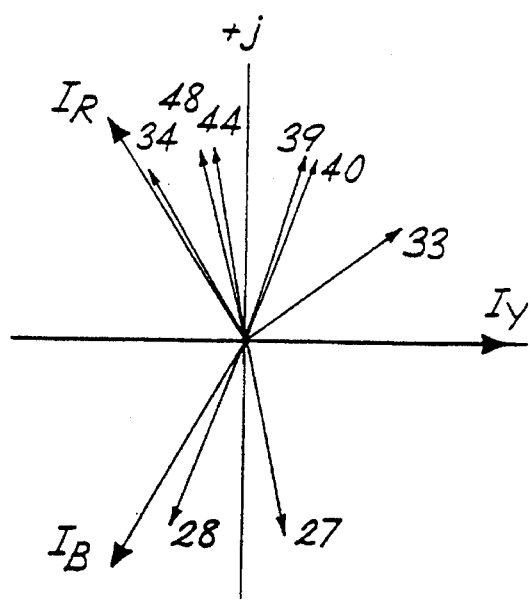
Figure 5C:
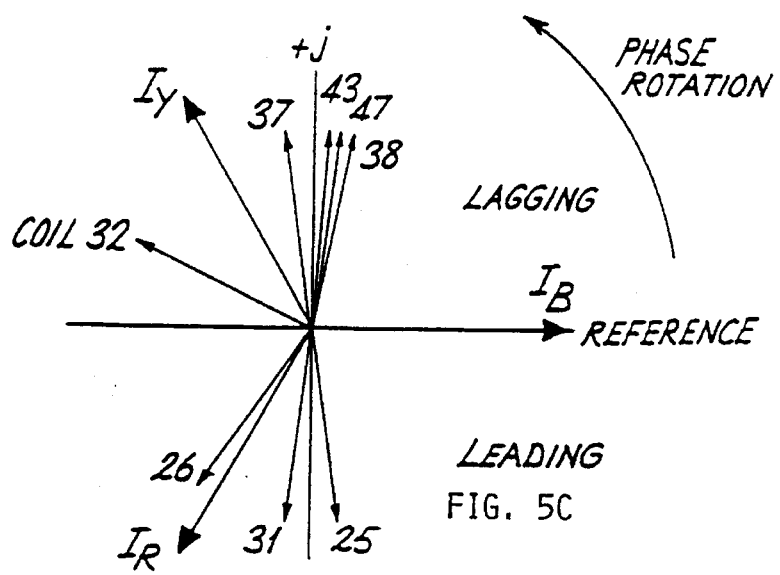

FIGS. 5a–5c show previously reported power factor angle plots for the coils of sections two 20 and three 22 (coils 23–48). Coils 23 to 31 all had leading power factors. Additionally 5 coils in section one 18 had phase angles of 45° to 48° indicating a lagging power factor of 0.7 which is about 8% better than for the basic machine, while coils close to the section 1/section 2 transition label 19 showed phase angles of 30° to 40° indicating a potential power factor of 0.86 for total machine current. The voltage phasers in FIGS. 5a–5c are distributed among all four quadrants whereas in a conventional rotary machine all would be in one quadrant. The phaser pattern was displaced bodily, showing an improvement in overall power factor, at higher values of mains current.

The action of the machine in this connection arrangement is to strongly couple section one 18 to isolated sections two 20 and three 22 exclusively via the reaction rail which provides a secondary circuit. The coupling permits the magnetization of the stator core of isolated coil section two and three by rail currents only and the continuous production of leading power factor current in these coil sections purely by electromagnetic induction from a brushless and solid reaction rail.

Figure 6:
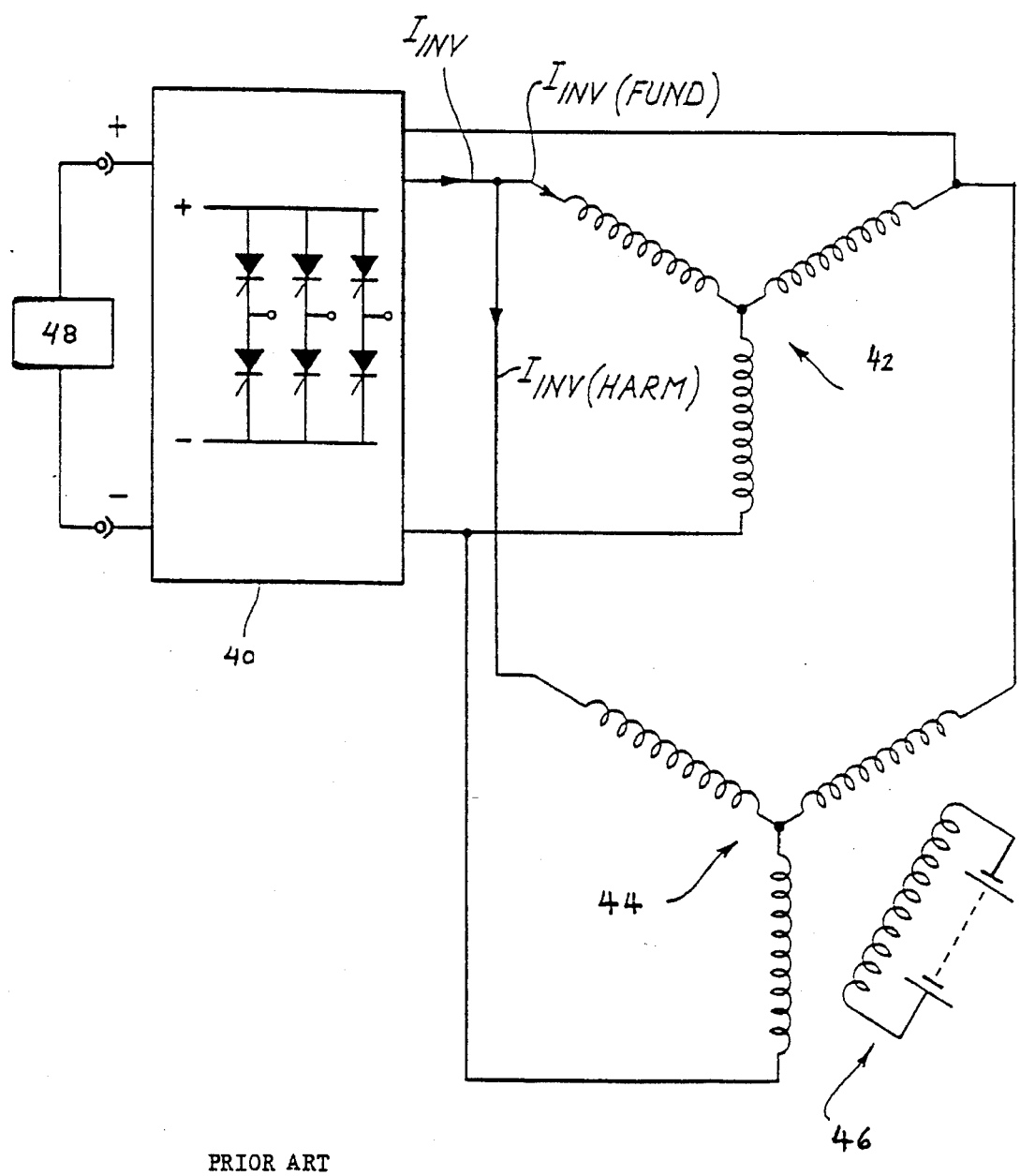
FIG. 6 shows a prior art connection arrangement for a 10,000 HP linear induction motor used for maglev propulsion, showing use of a separate DC-field synchronous condenser for reactive power compensation.

Practical applications of the invention demonstrated by the above tests are exemplified below. FIG. 6 shows a common, prior art, arrangement for operating a 10,0000 HP linear induction motor 42 from a variable-voltage variable-frequency semi-conductor controlled rectifier DC-link inverter 40. Reactive power cannot pass through a DC-link inverter and is supplied wholly by the D.C. field synchronous condenser 44. Some 90% of the reactive current goes to the motor and 10% to commutate the inverter. In detail a constant current D.C. source 48 supplies a line-commutated square-wave inverter 40 to operate the linear induction motor 42 and the synchronous condenser 44 which is in parallel with the series-connected LIM. The condenser DCSC additionally provides an effective harmonic filter. The synchronous condenser 44 has a D.C. excited rotor 46.

Figure 7B:
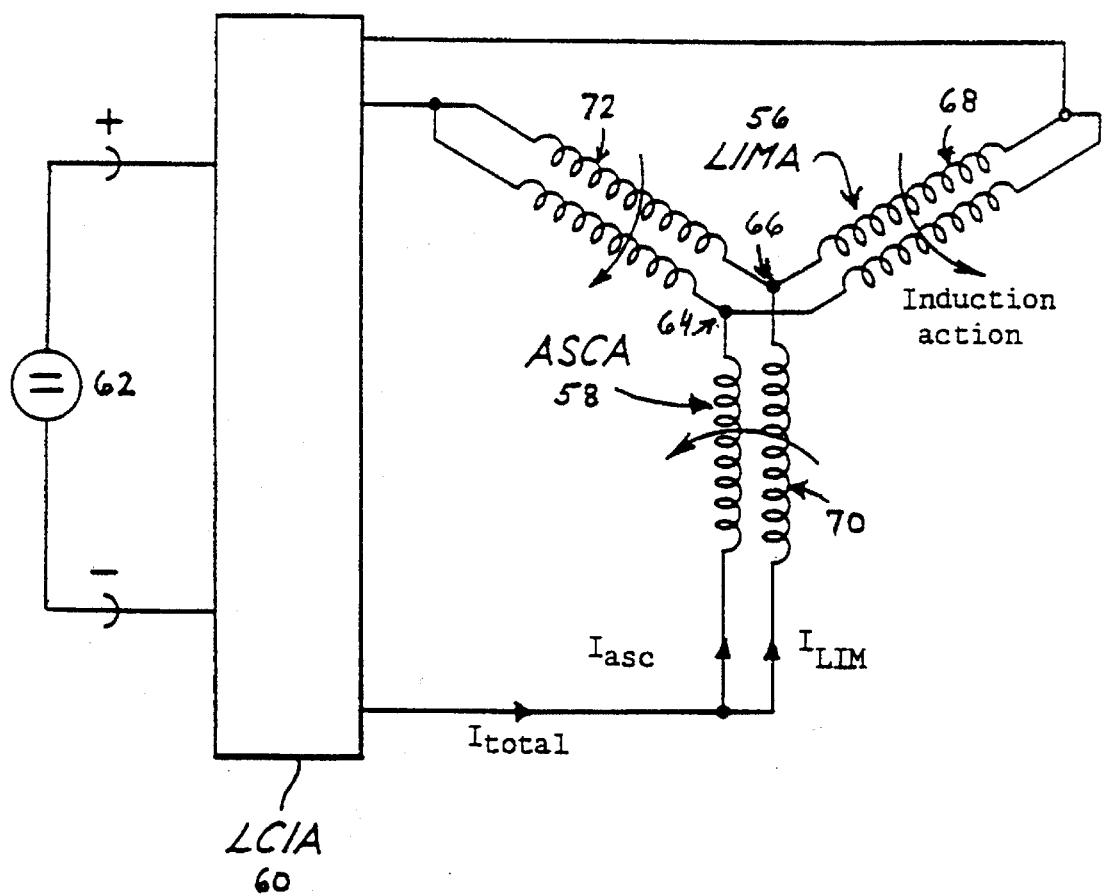

The invention permits a significant simplification and improvement of the prior art arrangement of FIG. 6. By using the currents in the reaction rail, induced by section one 52 of the windings of the stator 54 in FIG. 7a, a magnetization field to replace that of the D.C. energized rotor field 46 of FIG. 6 can be produced. This field is applied to sections two and three of the stator 50 which can now be considered as the stator windings of the synchronous condenser 58 as shown in FIG. 7b. In this arrangement the condenser is conveniently considered to be asynchronous (A.S.C.). Thus the test described in FIG. 4 with the zero-impedance connection of coils 23, 25, 27 labels 28, 30 and 32 can represent the provision of an asynchronous condenser with coils effectively in parallel with the stator (section 1) of a linear induction motor. The zero-impedance connection 26 is then a way of avoiding the practical problem of matching stator section impedance levels for actual parallel connection. In this way the overall power factor can be improved.

An approximation to the matched impedance is provided by adjusting complex impedances by means of a feedback-controlled thyristor electronic phase retarder in place of the zero-impedance loop.

A further advantage to propulsion systems embodying the invention when providing an ASC is that the supply waveform need not be sinusoidal. A convenient and commonly used technique for variable speed drives is to use an induction motor energized from a variable-frequency supply using silicon controlled rectifier inverter devices. The induction motor is usually a fixed-pole type designed for a sinusoidal supply and unless very expensive complex inverters are used their output includes substantial square-wave components. These cause square-wave currents in the motor with excessive losses and unyielding harmonic torques. Clearly the FIG. 6 prior art avoids these problems but requires a costly synchronous machine, 44 and 46. The invention in one aspect provides a machine including an ASC to act as filter of higher-order supply harmonics such as 5th, 7th, 11th and 13th harmonics providing a substantially sinusoidal fundamental to the propulsive winding. The ASC is provided by a separate winding but in the majority of design applications mounted on the same core and in the same physical structure as the main propulsive windings. The ASC may have a separate magnetic yoke and core distinct and different from the primary winding core and yoke. The ASC winding requires a significantly higher terminal impedance than the propulsive winding at the energization frequency, if connected in a parallel mode, at the machine terminals.

Desirably when the ASC winding is applied in parallel to the primary in combination with guideway or track mounted reaction rails of large inertia, it is used as an electromechanical current harmonic filter. The ASC winding offers maximum impedance to the fundamental while its lowest impedance can be designed to occur at the strongest harmonic which is usually the fifth in the case of a square wave inverter. FIG. 7 shows at 7a a stator block 54 and at FIG. 7b an outline circuit for a variable speed arrangement of integrated machine LIMA 56 and ASCA 58 powered via a line (i.e. ASC) commutated 6-pulse bridge current source inverter (LCIA) 60. The input source for item 60 is a direct current supply 62. This arrangement is for a linear machine and eliminates the need for large commutation capacitors or an auxiliary synchronous machine to commutate the inverter thyristor devices. Also the weight and capital cost for a given rating will be reduced. The stator block 54 has two slot regions, 52 at one uniform pitch for the linear machine and 50 at a shorter uniform pitch for the ASC portion. The ASC magnetic yoke is of reducing iron volume; the flux density falls as reaction rail currents decay exponentially after leaving the propulsion machine portion.

An important feature of the invention is that the frequency of the recovered electrical energy is the same as that supplied to the propulsion windings. The slip-frequency from propulsion winding to reaction rail and back to recovery winding is offset by the higher field speed in the recovery winding to bring this about. This harmony of the machine frequency is important in that among other things it permits the recovered energy to be sent back into the supply 62 if this is desired.

With reference to FIG. 7a, in the primary (stator) arrangement 54 described so far power factor has been improved by recovery of exit-end power although the power factor of the propulsive, linear motor, part of the machine 52 will still have the usual low power factor and excessive reaction rail ohmic losses albeit that these are at a reduced level. The constraint of exponential rise in airgap flux along the propulsion windings will remain, although mitigated by the above recovery, but the power factor can be improved. With reference to FIG. 7b, another constraint is that the stator current loading in the ASC generator portion 58 must be less than in the propulsive portion 56 for a leading power factor. The stator current loading is defined as:

$$J = \frac{\text{total ampere-turns/slot}}{\text{slot-pitch-longitudinal}}$$

The stator current loading $J_{s(a)}$ of the ASC can differ from that of propulsive part $J_{s(p)}$, and can also vary from coil to coil of the ASC. The change in stator current loading between propulsion and recovery windings is identified as a "J-jump" which is a term used herein to identify this technique. Series-connection is possible between propulsive and ASC windings.

With reference to FIG. 7b, the variable-frequency current regulator 60 permits adjustment of machine conditions for different load conditions such as different mechanical loads and different machine terminal power factors. That is to say for differing balances of real and reactive power resulting from the particular mode to the recovery section, if the mechanical load conditions are predictable and steady, e.g. a fan or pump, then ASC windings star-connected to a floating star point 64 can be connected at the high side to appropriate tappings 68, 70 and 72 on the propulsive windings to achieve the required current reduction at the load despite any impedance mismatch. Start up is inefficient due to the ASC but this does not matter for steadily-running equipment. This tapped connection provides a commercially attractive device without an induction regulator or SCR inverter.

Figure 7C:
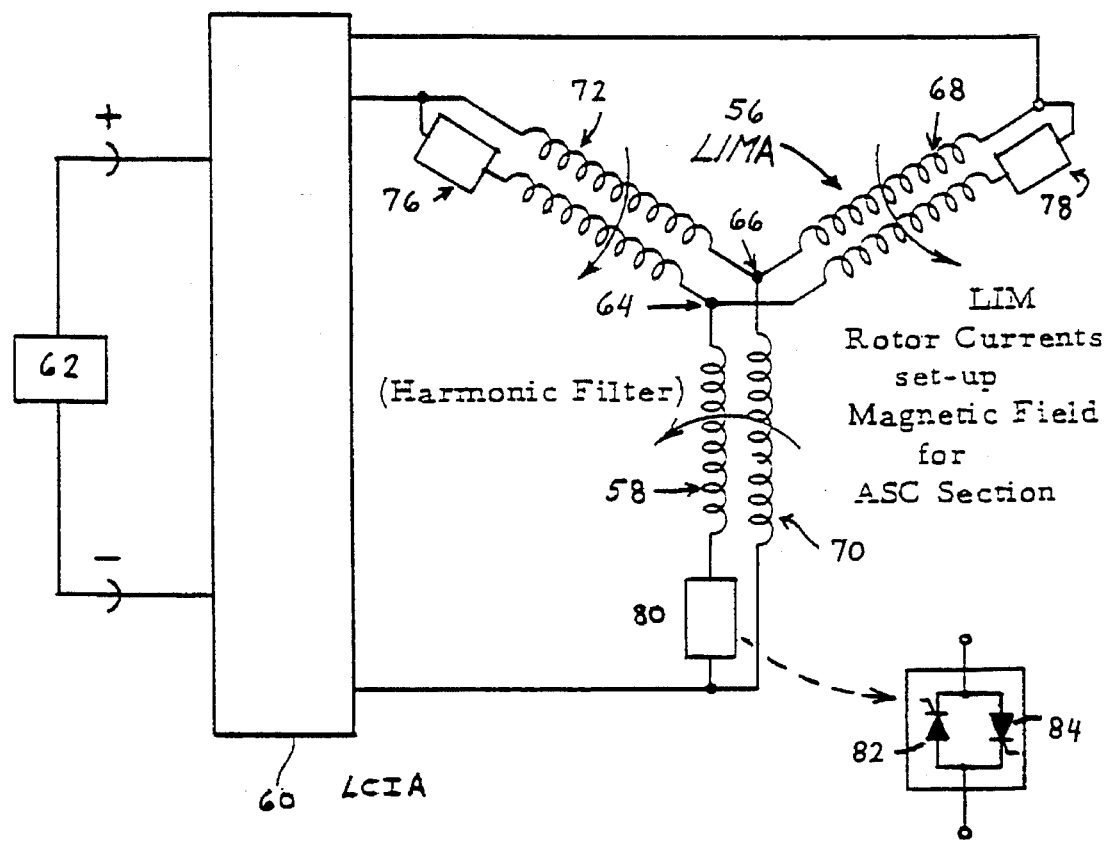

FIG. 7c shows an improvement over the apparatus shown in FIG. 7b whereby a current regulator 76, 78 and 80 is inserted in series with asynchronous condenser windings 58 in each of three phases. The regulators are composed of two switching devices 82 and 84 connected in anti-parallel which have the capability to control either the phase angle of the asynchronous condenser current or its magnitude by phase delay or phase chopping action respectively. Regulators 76, 78 and 80 may be composed of solid-state devices such as thyristors, power transistors, or MOS-controlled thyristors (MCTs) or of nonsolid-state devices such as ignitrons or similar gaseous-medium high power switching elements. The purpose of the regulators is to allow compensation of the asynchronous condenser output under varying speed and magnetic flux conditions and to provide a means of regulating the leading ASC reactive current to match the lagging reactive current being consumed by the propulsive windings 68, 70 and 72.

Figure 8A:
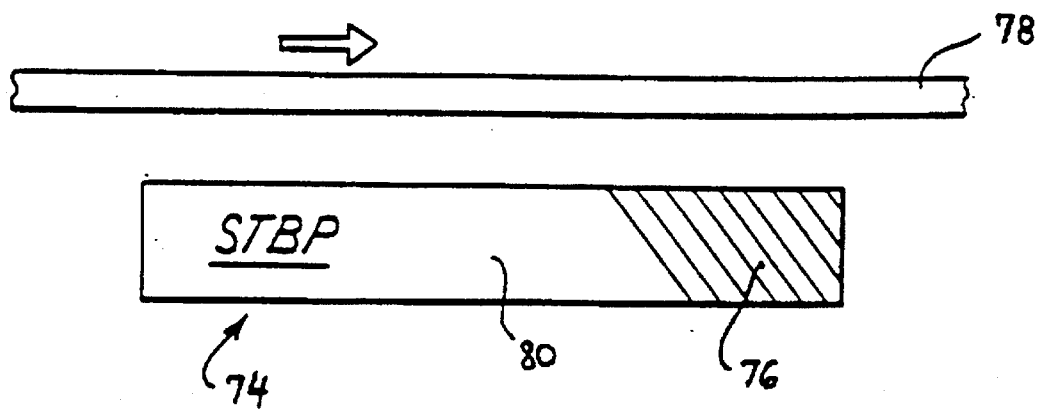
FIGS. 8a and 8b show in outline the distribution of types of primary (stator) winding in single-sided and double-sided LIMs respectively employing the invention.
Figure 8B:
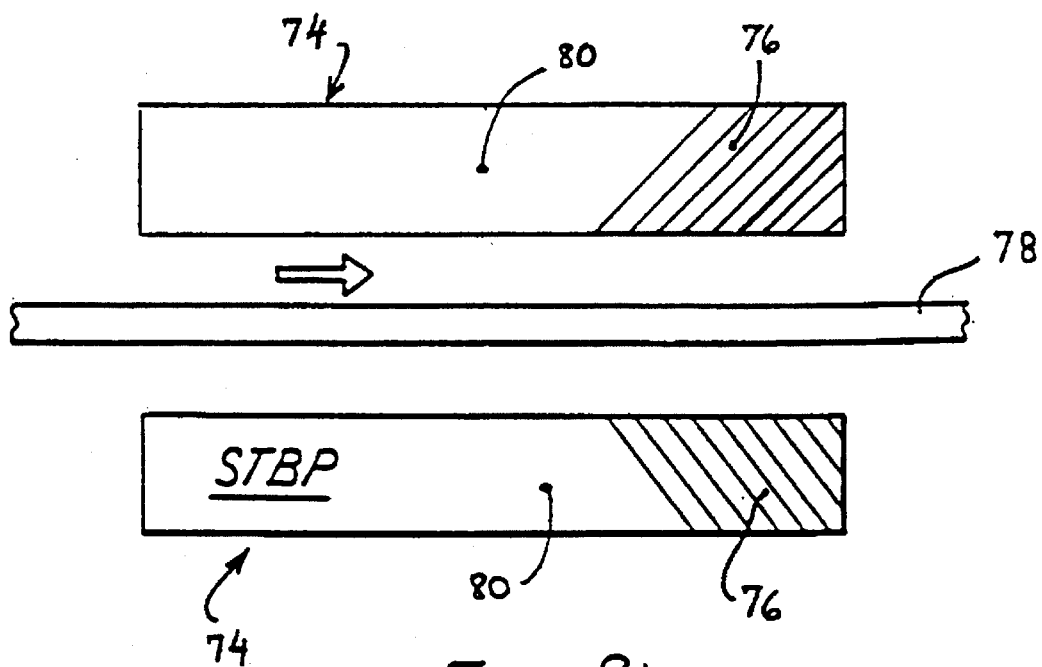

FIGS. 8a and 8b are a linear machine with a stator 74 and solid or sheet reaction rail 78 for single-sided and double-sided machines, respectively. Portion 80 of the stator has the propulsive winding applying power at a lagging power factor to the machine to drive the reaction rail. Portion 76 (shaded) of the stator has the recovery winding recovering reactive power from the reaction rail 78 at least partly at a leading power factor to improve the overall power factor. It will be seen that the allocation of windings along the stator is relatively uncomplicated and segregated, recovery being by "end-effect" action as the reaction rail moves out from under the stator. The technique of a change in stator current loading described above can be applied within multiple sections of the recovery winding if required.

The reaction rail and overall magnetic design should however have a high ratio of magnetizing, inductance to reaction rail resistance to provide a high level of applied magnetic flux during movement past the stator from propulsion to recovery portions.

The linear machines described so far can be improved by the "J-jump" technique of lowering the recovery portion ampere-turns with respect to the reaction rail induced ampere-turns to maximize leading power factor generation in the recovery windings, as mentioned above. It is convenient for manufacturing and design reasons to have a form of lumped ASC winding although a fully distributed ASC with multiple jumps in current loadings winding has some theoretical advantages.

The "J-jump" technique described herein embodies the invention and provide examples of constructional techniques for AC machine windings by means of which along a machine primary-secondary gap a transient to a different field conditions across the gap can be achieved. The invention is not limited to embodiments of one or other of these techniques but these have been found effective in putting the invention into practice.

Figure 9:
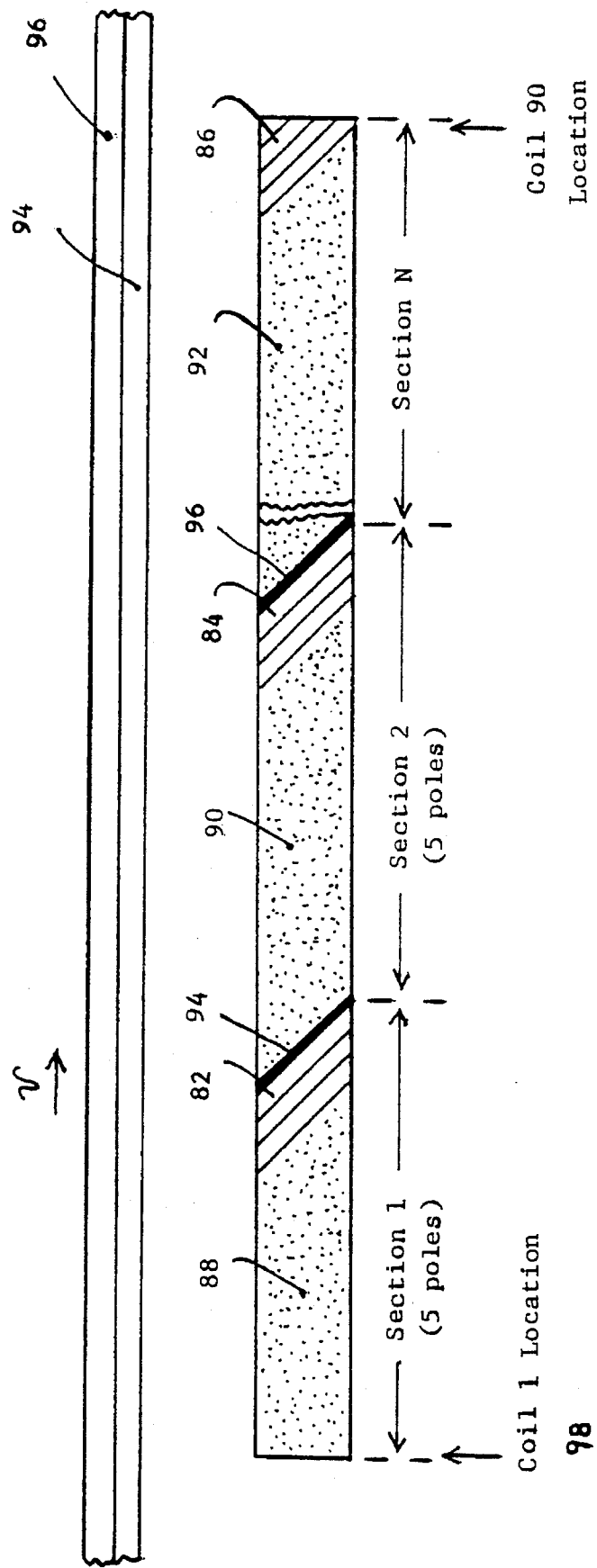
FIG. 9 shows in outline another such winding distribution embodying the invention for a single-sided maglev propulsion motor with either single or multiple reactive recovery zones.

FIG. 9 shows one possible distribution of the winding portions in a linear machine with "N" multiple ASC segments 82, 84, 86 and "N" multiple propulsive sections 88, 90, 92. Zone 94 is positioned between 82 and the subsequent 90 as a transition zone to insure correct phase angle of induced rotor current in each repeatable section. By way of example the machine chosen is basically a 3-phase 35 HP 15-pole single-sided induction motor. The example shows three discrete ASC segments and three propulsive windings. Clearly other frame sizes and pole number could be used. Stator and reaction rail details for the 15 pole machine are given in Table I. The reaction rail is composed of two pieces. Item 94 is the non-ferromagnetic, conducting material usually of solid construction and wider than the stator width or core length. Item 96 is the ferromagnetic, backup plate composed of either solid or laminated material to minimize stray eddy-currents.

TABLE I

| | |
|---|---|
| No. of Poles | 15 |
| Repeatable Group Sections | 3 |
| Longitudinal Core Length | 3.24 m |
| Transverse Core Width | 0.157 m |
| Stator Block Depth | 0.120 m |
| Slot Width | 0.0143 m |
| Slot Depth | 0.0381 m |
| Slot Pitch for Primary | 0.0270 m |
| Slot Pitch for Tertiary | 0.0243 m |
| Aluminum Reaction Rail Thickness | 0.0095 m |
| Reaction Rail Width | 0.229 m |
| Thickness Backiron Steel | 0.019 m |
| Operating Airgap | 0.010–0.012 m |
| Total Number of Coils | 113 |
| Primary Parallels per Phase | 2 |
| Stator Turns/Coil | 12 for Primary Wdg. |
| | 30 for Tertiary Wdg. |
| Mean Length of Primary Coil | 11.54 m |
| Slots/Pole/Phase | 2.5 |
| Total Number of Slots | 120 |
| Pole Pitch - Primary | 0.2025 m |
| Pole Pitch - Tertiary (for 10% slip) | 0.1823 m |
| Coil Span/Pole-Pitch Ratio | 0.80 |
| Aluminum Resistivity at 20° C. | $3.25 \times 10^{-8}$ ohm-m |
| Russell & Norsworthy Factor | 1.933 |
| Total Stator Copper Cross Section/Phase | $7.88 \times 10^{-6}$ sq. m. |
| Pole Pitch: Airgap Ratio | 16.6:1 |

Figure 10A:
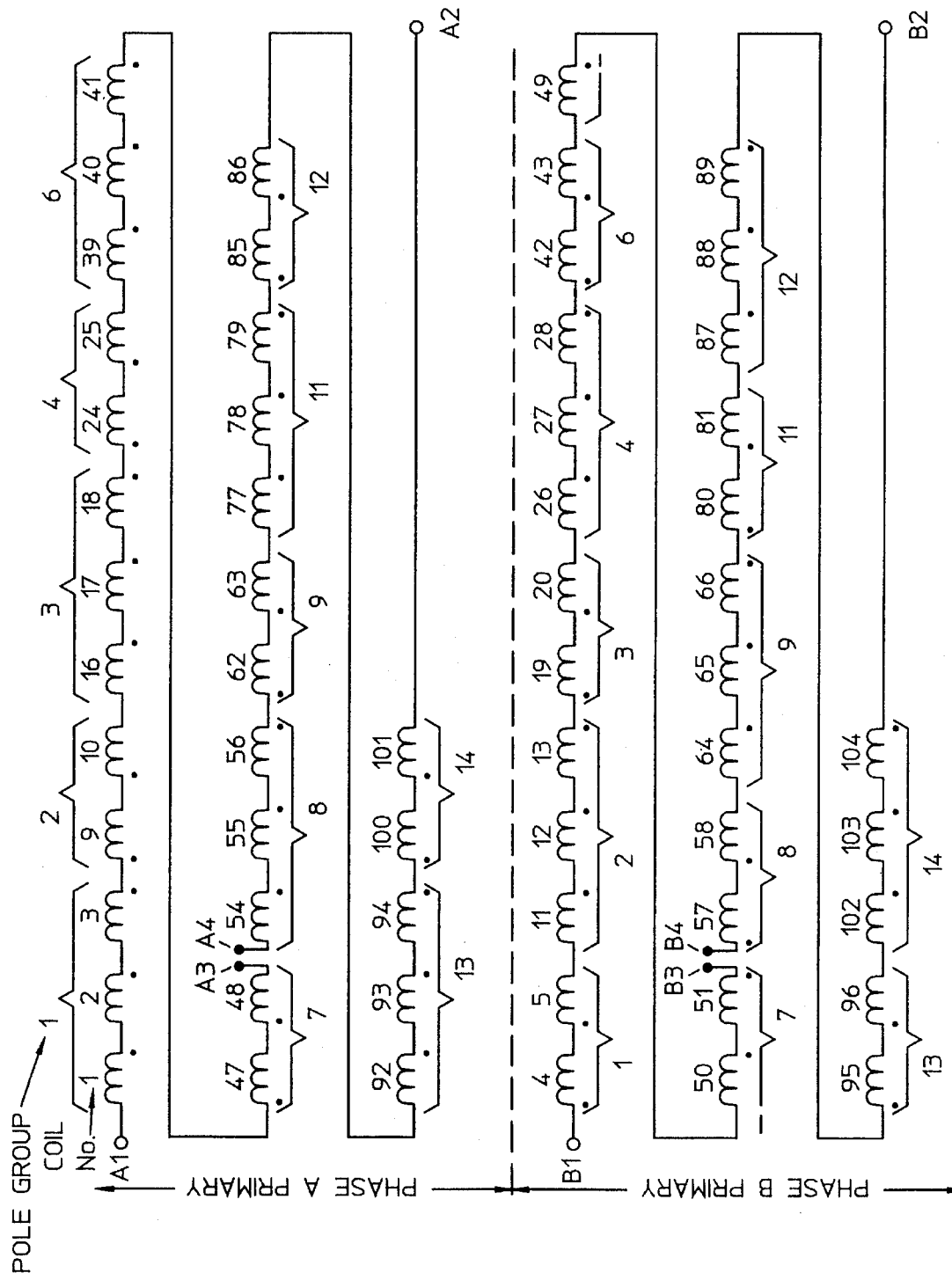
FIGS. 10a and 10b show the primary (stator) winding details for a 12 pole LIM propulsion motor conforming to the outline in FIG. 9 with a 3-section tertiary winding for power factor compensation.
Figure 10B:
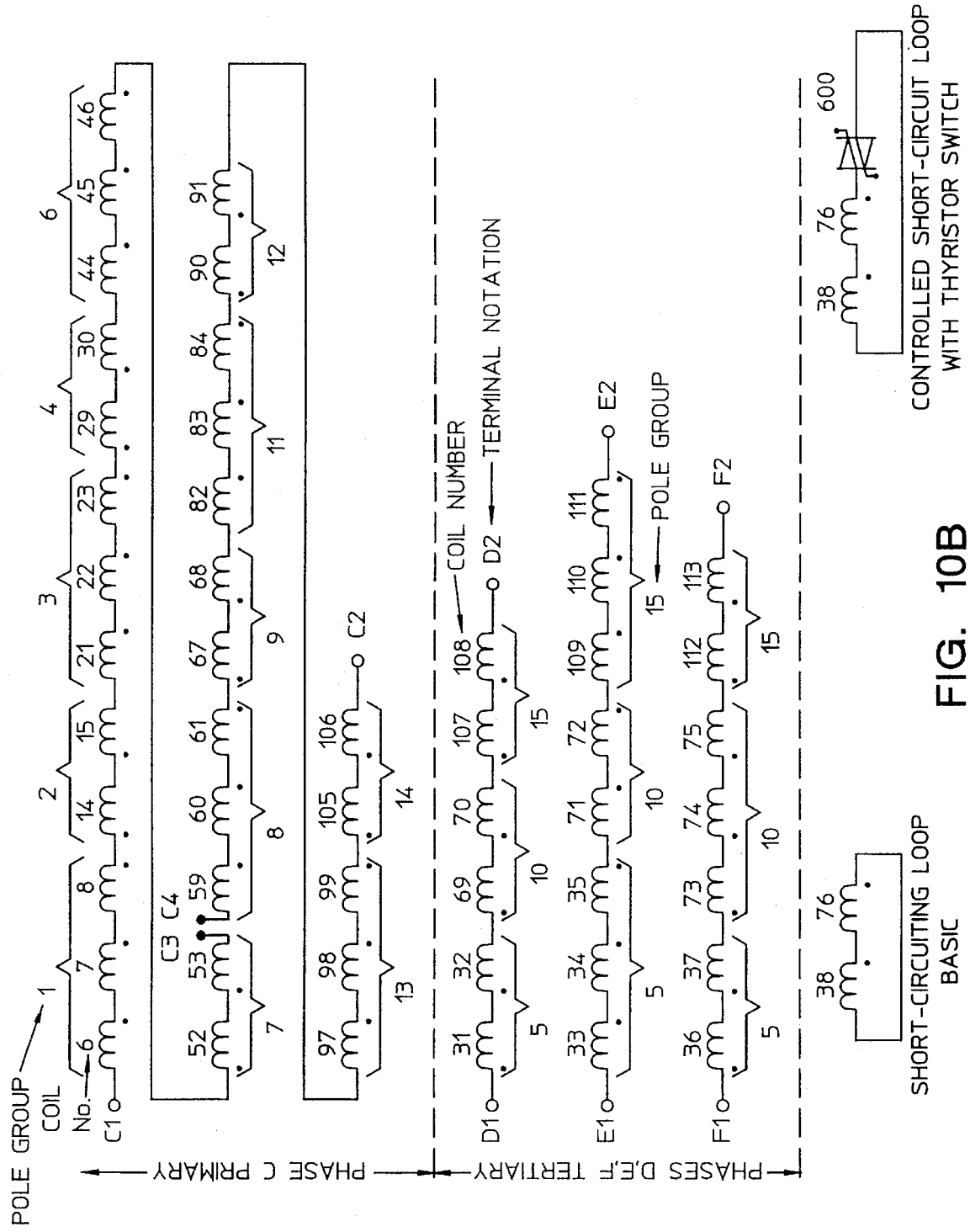

FIGS. 10a and 10b show the elementary coil connections and spatial layout of a 113 coil, 3 phase stator with primary, tertiary and short circuiting coils corresponding to the general representation shown in FIG. 9 and more fully described in Table I. Each phase group of the primary has pole groups labeled 1–4, 6–9 and 11–14. Each tertiary winding has phase pole groups 5, 10 and 15. The short circuiting loops are composed of coils 38 and 76 in series with a bilateral thyristor switch 600. This is a preferred embodiment with a 15-pole, 3 section series winding for both the primary and tertiary members for the particular case of 2.5 slots/pole/phase and a 3.24 meter overall stator core length. In the preferred embodiment, the tertiary is connected in wye at the terminals to the primary. The primary may be split into two separate sections and connected as either wye-wye as shown in FIG. 11a or in wye-delta as shown in FIG. 11c.

In FIGS. 10a and 10b, the primary winding is the power propulsion winding with a total of 106 coils. The tertiary winding is the reactive generating member with a total of 21 coils and two coils for the short circuiting loop. The reactive winding has "1 plus" poles at each section due to the reduction in pole pitch by the factor (1-slip value) for the slip taken at the rated operating point. The use of the short circuiting loop helps assure that the phase of the secondary reaction plate flux under re-entering for section 2 or 3 is of the proper phase angle so as to insure rapid build-up of propulsion thrust. The amount of short circuiting current in coils 38 and 76 is dependent on the speed of the secondary member and the Magnetic Reynolds Number.

Figure 11A:
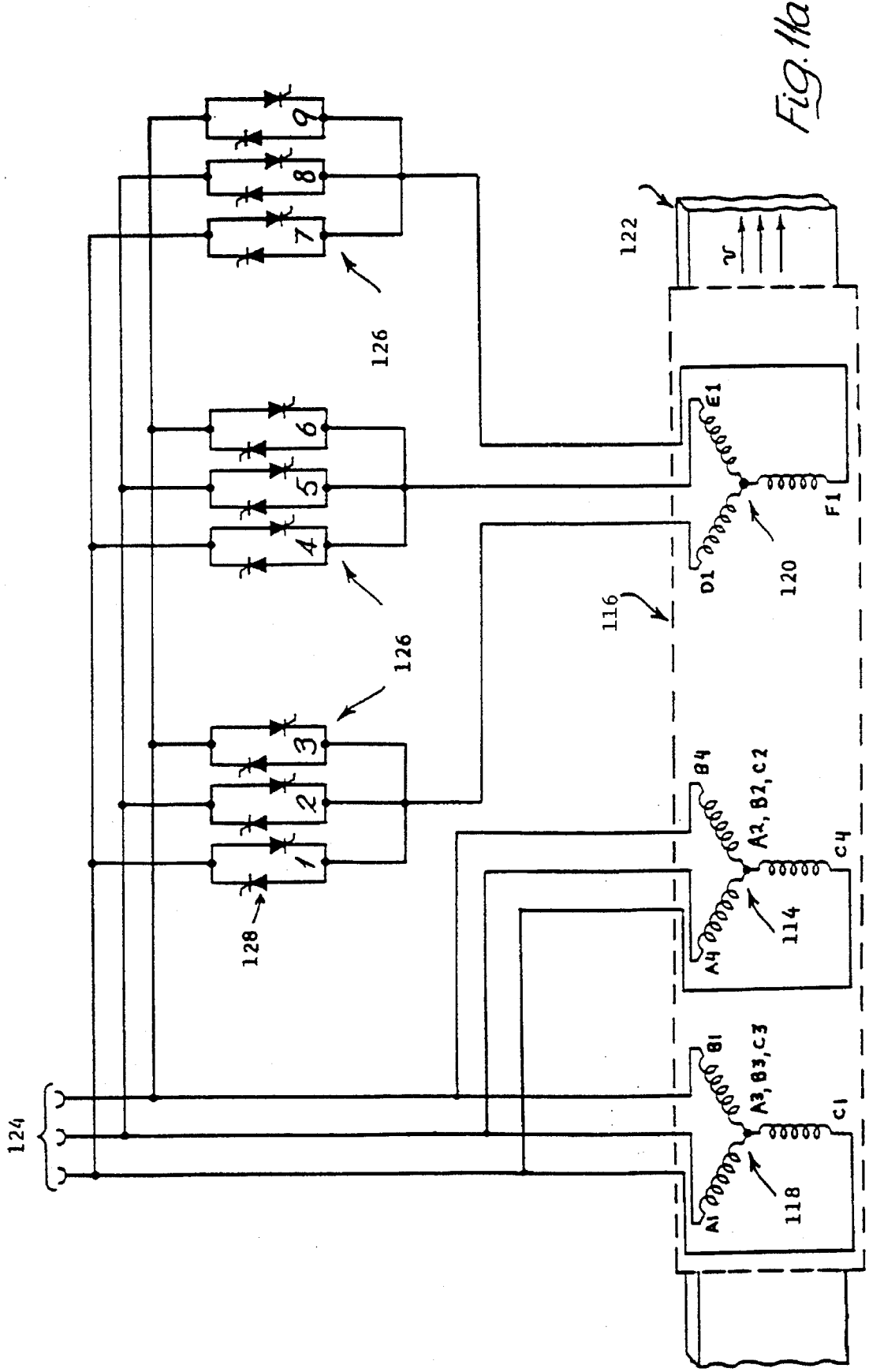
FIGS. 11a, 11b and 11c show such a winding diagram for a motor including thyristor switching devices in the winding.
Figure 11B:
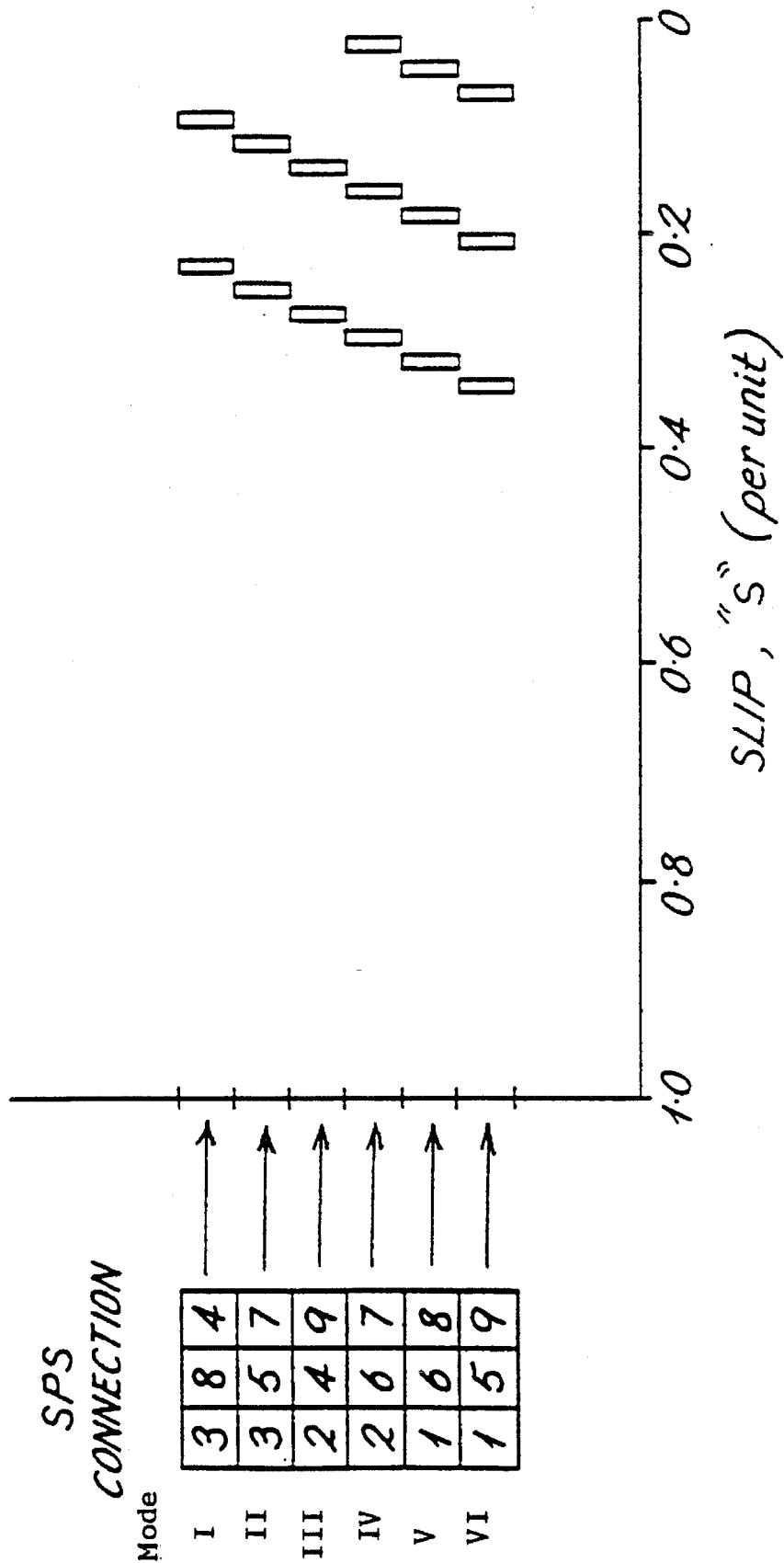
Figure 11C:
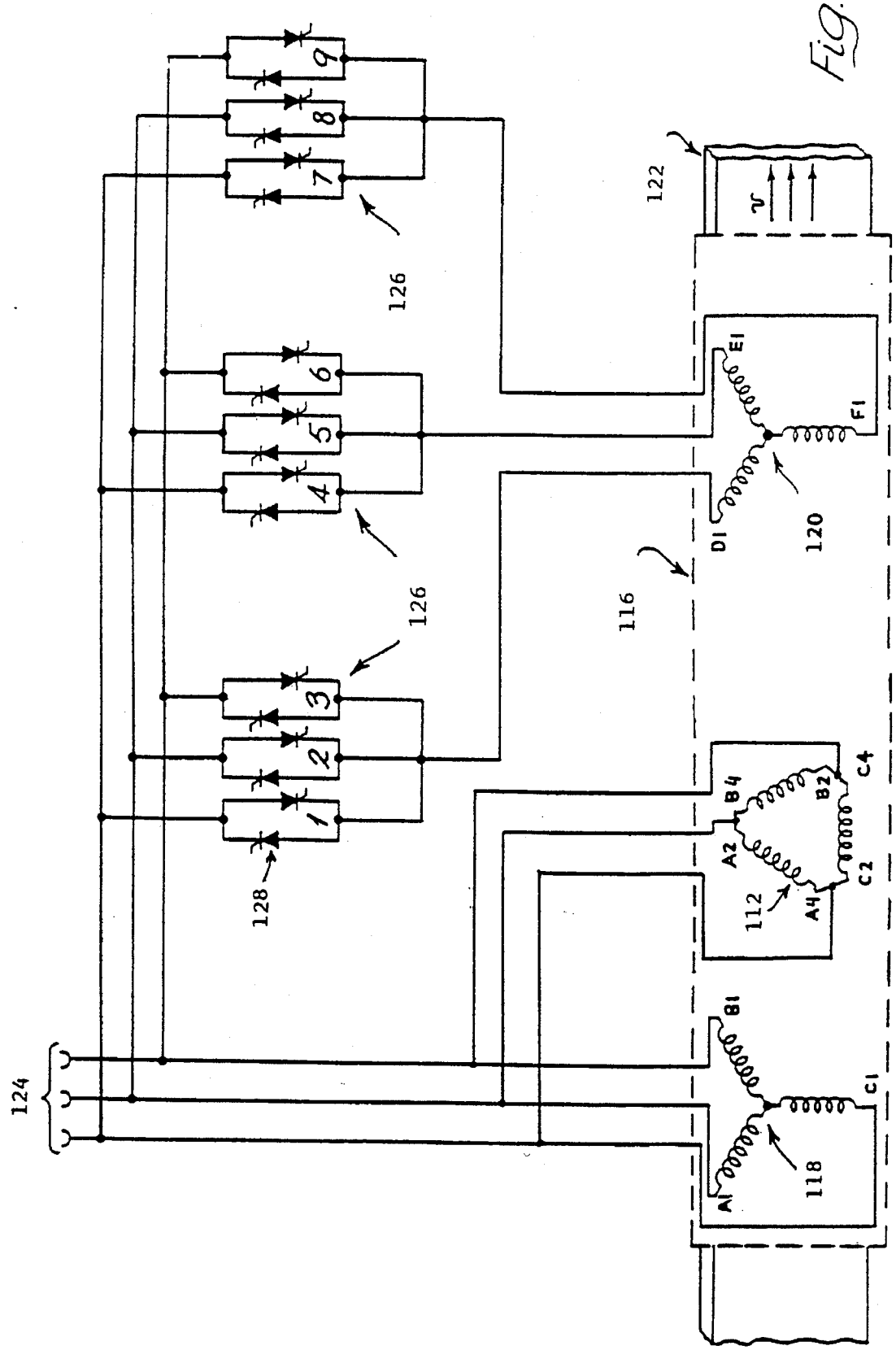

In this embodiment, the tertiary coils are wound to a higher number of turns (such as 30/coil) than the primary coils (12 turns) when the current injection scheme shown in FIGS. 11a and 11c is used. The approximate difference in the coils turns is calculated by the ratio:

$$\frac{\text{Coil Turns Tertiary}}{\text{Coil Turns Primary}} = \frac{\text{Total Primary Coils in Series}}{\text{Total Tertiary Coils in Series}}$$

for the specific embodiment shown this ratio is 53:21=2.52. Thus if the primary split-wye is specified with 12 turns then the tertiary will have 2.52×12=30 turns/coil. The exact determination of coils turns must be made based on the spatial distribution of coil turns must be made based on the spatial distribution of airgap flux, which is generally exponential and very much speed dependent. The segregation of the primary into two connection groups/phase becomes necessary when either long stator blocks are produced or very high current primary windings are specified. In the FIG. 11a, the primary groups may be as follows:

Phases A, B or C when connected as two parallel wye
  Pole Groups 1, 2, 3, 4, 6, 7 in series across line
  Pole Groups 8, 9, 11, 12, 13, 14 in series across line
  All with equal turns/coil and pitch factor
In FIG. 11c, the arrangement should be:
Phases A, B or C when connected as wye-delta as per FIG. 11c
  Pole Groups 1, 2, 3, 4, 6, 7 in series across line wye with N turns/coil.
  Pole Groups 8, 9, 11, 12, 13, 14 in series, delta across the line with N×1.732 turns/coil.
  All with equal pitch factor.

The solid-state thyristor cycloconverter-style phase shifter 126 shown in FIGS. 11a and 11c is used to provide variable phase displacement between primary 118, 114 or 112 and tertiary 120 sections. The embodiment includes other types of phase shifters such as magnetic-induction polyphase phase angle shifters and or use with alternate switching elements such as gaseous tube or ignitron devices if very high voltage, e.g. 20 kV or higher is specified for the primary voltage level.

FIG. 11a shows a connection arrangement of a short-stator linear induction machine 116 and 122 embodying the invention to permit the correct phase shift between the propulsion 118 and ASC windings 120 over a wide speed range. The machine has a primary 116 of a propulsion portion 118 and a condenser portion 120. The machine secondary 122 is, in this embodiment, an elongated reaction rail. Clearly other machine constructions could be used. The propulsion portion 118 is energized directly from the supply 124, typically 3 Ø 60 Hz. The condenser portion 120 is connected to the same supply through a semiconductor phase shifter 126. Conveniently this is a 6×60° phase shifter provided by thyristor devices 128 in nine gated groups each containing a pair of devices, or possibly a suitable bilateral device.

FIG. 11b shows the gating required for different slip values, on a per unit basis. The blocks in FIG. 11b are permissible operating zones. A small, say ±2%, adjustment of the operating voltage covers the "deadband" spaces. The distinction of the phase shifter from the superficially similar cyclo-converter is emphasized. Firstly there is only phase-shifting at 60° steps not frequency conversion. Secondly the devices are always gated at a zero delay angle without phase chopping, the aim is a transient-free connection of the ASC 120 and the supply 124 at the desired phase. Thirdly the required gating is set by the phase difference between the propulsion 118 and ASC 120 portions which is related to the reactive power capability of the condenser winding and the slip in the propulsion portion.

FIG. 11c shows a variation of the apparatus presented in FIG. 11a whereby the propulsive section of the LIM 116 is provided with a wye-connected winding 118 in the first half of the primary nearest the entry-edge and followed by a delta-connected winding 112 at the center of the machine wherein both windings are connected in parallel to the polyphase supply 124. The asynchronous condenser winding 120 is wye-connected to the phase-shifting apparatus 126 incorporating switching elements 128 and then connected to said polyphase supply 124. The direction of secondary 122 motion is indicated by label "v". The advantage of having the LIM connected as wye-delta-wye is due to the elimination of various space harmonics in the magneto-motive force distribution to retain the propulsive component of flux density, $B_p$ at the highest level possible. The turns per coil in windings 118, 112 and 120 are different in this arrangement. The said invention has an arbitrary longitudinal span for each winding according to the parameters of secondary resistivity, synchronous speed, slip, current loading and pole-pitch.

However, a less complex technique is also needed for wider commercial acceptability and simplicity. For example semiconductor (thyristor or transistor) devices could be included in selected windings to extend the passively selected operating conditions by providing some automatic variation of phase relationship during operation.

The preferred embodiment of the harmonic filtering capability of the described invention when used as a current-source/current-sink is shown in FIG. 12. This is a 3-phase, 9 pole primary winding in 108 slots, wound as 3 slots/pole/phase with all series connections. Table II contains detailed design information on the overall machine design as a 5000 HP, 37,000 N thrust propulsion machine with built-in harmonic current filter windings specific to attenuating the major harmonics present with a 6 or 12 pulse current source inverter which are the 5th, 7th, 11th and 13th harmonics. Higher harmonics such as the 3rd, 9th, 15th, 17th or 19th are not considered significant. The reaction rail is Aluminum Type 6061-T6 of thickness 15.8 mm, 0.46 m overall width backed by a laminated steel magnetic return plate of thickness 50 cm and transverse width 0.311 m corresponding to the stator design presented in Table II.

Figure 12A:
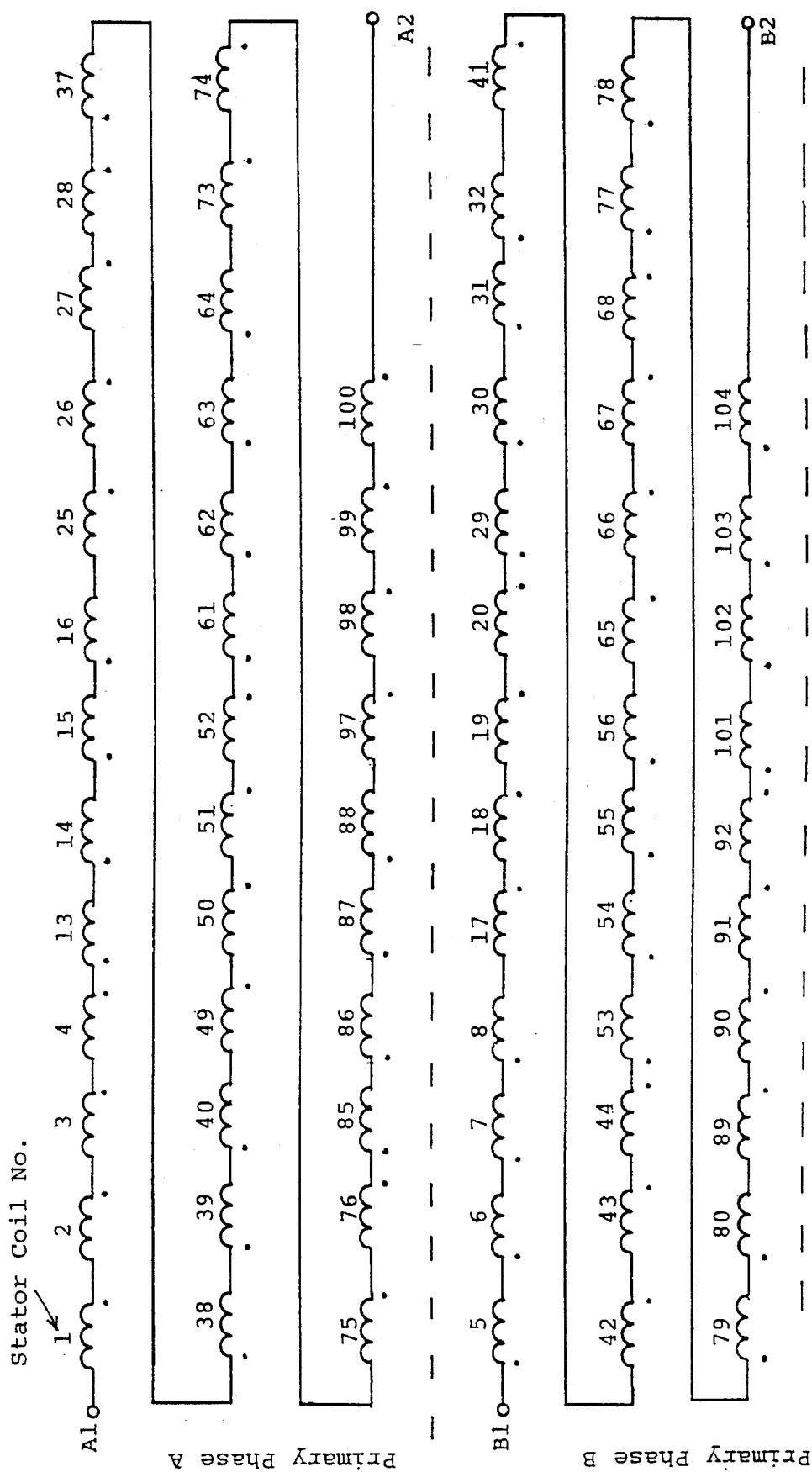
FIGS. 12a, 12b, 12c, 12d and 12e show connection arrangements and winding diagrams for a 9-pole LIM embodying the invention for an odd number of primary poles and a 4-stage tertiary winding used for harmonic current filtering.
Figure 12B:
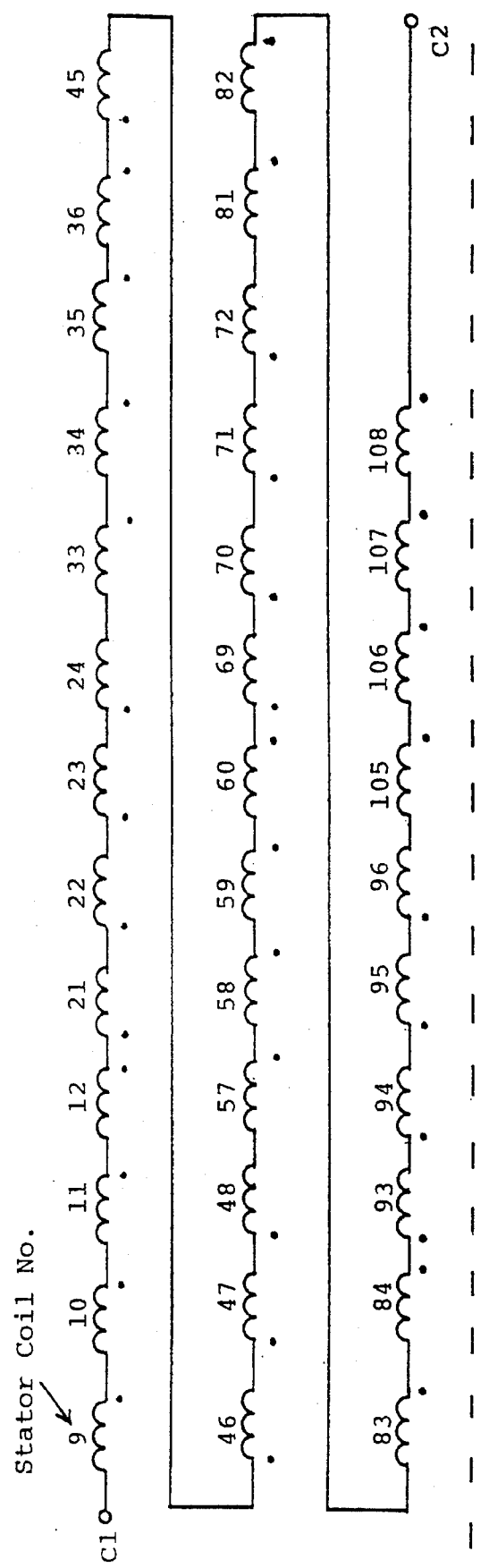
Figure 12C:
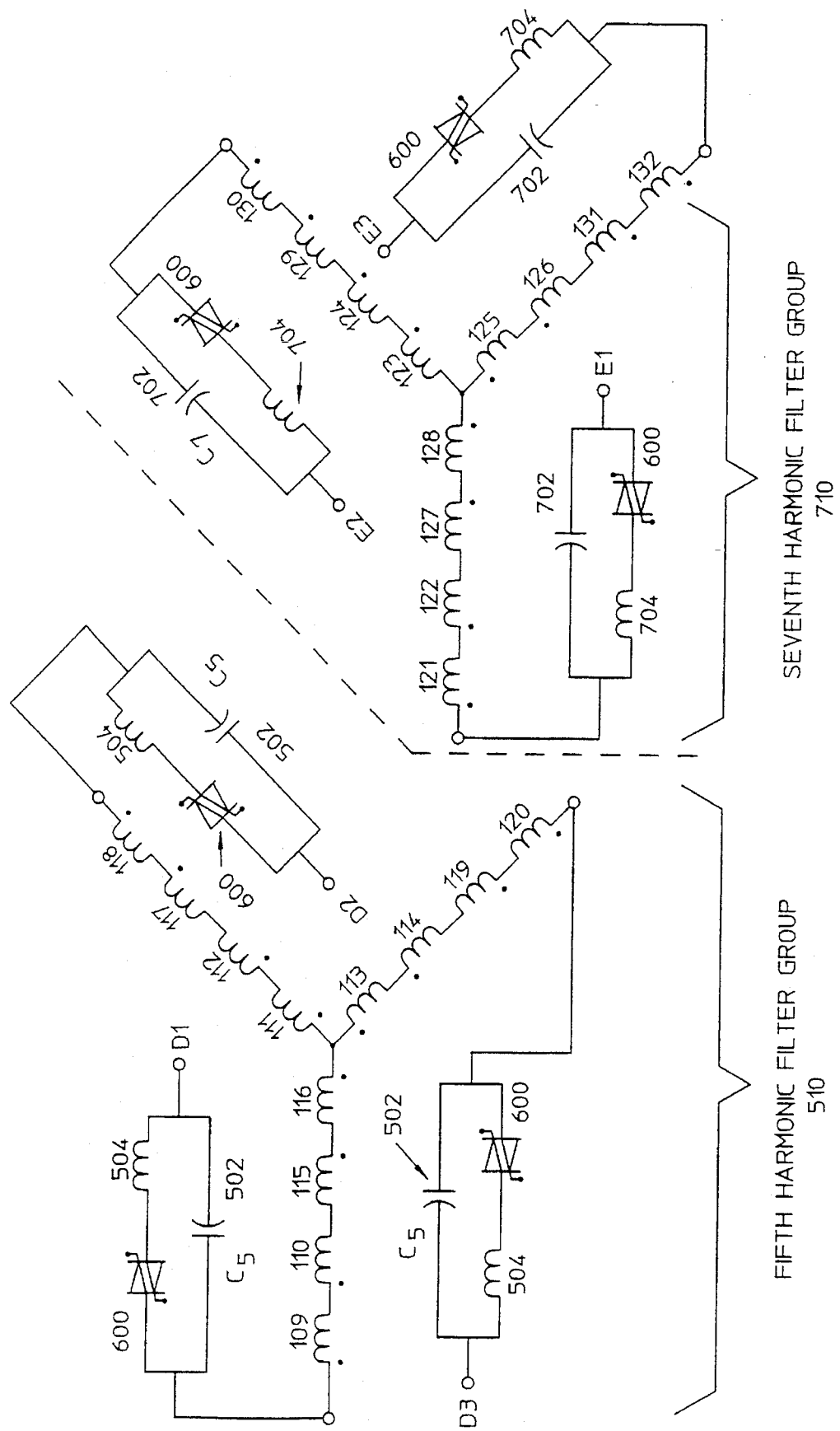

FIG. 12c shows the phase layout for the 5th and 7th harmonic filters. The fifth harmonic tertiary winding is designated by terminals D1, D2 and D3. Stator coils 109 through 120 are of reduced pole pitch (by ⅕) so as to produce a traveling wave in the airgap equal in propagation speed to the main traveling wave. Each phase has a thyristor controlled capacitor 502 and parallel inductor 504 to modulate the output of each phase as a function of machine speed, frequency of the harmonic and airgap quadrature flux level in each winding. The Fifth harmonic group is designated as 510. At low frequencies such as at starting conditions, the thyristor 600 is entirely off and when at high frequencies, whereby maximum output is obtained from the magnetic windings, the thyristor 600 approaches the fully-on state, thereby creating a parallel off-resonant tank circuit.

The parallel inductor 504 is either an air-core reactor or an iron-core, non-saturable gapped reactor. The device 600 is a bilateral switching device such as a thyristor, insulated gate bipolar transistor (IGBT), MOS-controlled thyristor (MCT) or similar solid-state switching device with equal conduction and blocking characteristics in both current flow directions, by virtue of using two devices in anti-parallel.

The Seventh harmonic circuit is designated by terminals E1, E2, and E3 with tertiary coils designated 121 through 132. Capacitor 702 and inductor 704 are specific for the 7th harmonic filtering and to the reactance level provided by coils 121 through 132. These coils are of a higher impedance and higher inductance than the similar coils from the fifth harmonic section, and are rated at fewer ampere-turns than the Fifth harmonic section. The seventh filtering group is designated as 710.

Figure 12D:
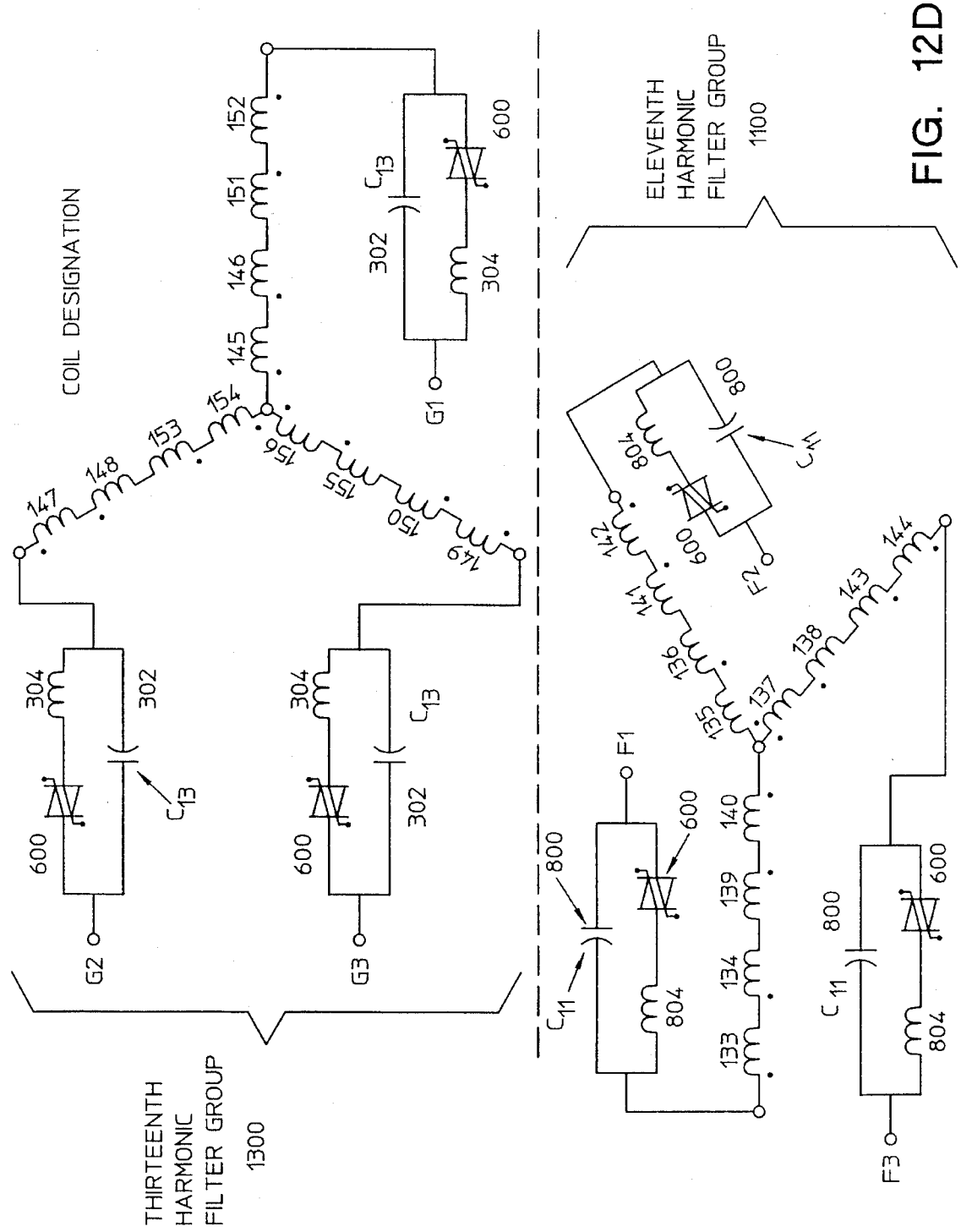

FIG. 12d shows the 11th and 13th harmonic groups, both shown in the preferred embodiment with two poles and immediately succeeding the 7th harmonic filtering group 710. The eleventh harmonic group is designated 1100 and contains tertiary coils 133 through 144, which are wound to one-eleventh of the primary pole pitch and interact with the main wavelength quadrature flux in the airgap. Each phase is connected to off-resonant capacitor designated 800 and controlled through thyristor switching device 600 and parallel inductor 804. Terminals are designated F1, F2 and F3.

The thirteenth harmonic group is designated 1300 and contains tertiary stator coils 145 through 156, which are wound to one-thirteenth of the primary pole-pitch, 2 slots/pole/phase and interact with the main quadrature airgap flux existing in the tertiary zone and at the exit-end of the machine where the flux density is the usually lowest for the whole machine. Each phase is connected to off-resonant capacitor 302 and controlled by bilateral switching device 600 through parallel reactor 304. Terminals are designated G1, G2 and G3.

It is understood that in addition to each harmonic section containing distinct and separate pole pitches that each winding is subject to having its own pitch factor, distribution factor, coils turns and ampere-turn rating in relation to the specification for the amount of filtering required and manufacturing constraints such as the overall length of the stator block.

The preferred embodiment shown specifies a total of 48 tertiary coils for filtering in 4 stages but obviously simplifications of this approach such as only having two stages result in reduced manufacturing cost. The system provides automatic compensation in that as the overall drive system output voltage is reduced below nominal (e.g. with lower command thrust), the airgap flux and induced current in the tertiary is proportionally reduced.

Figure 12E:
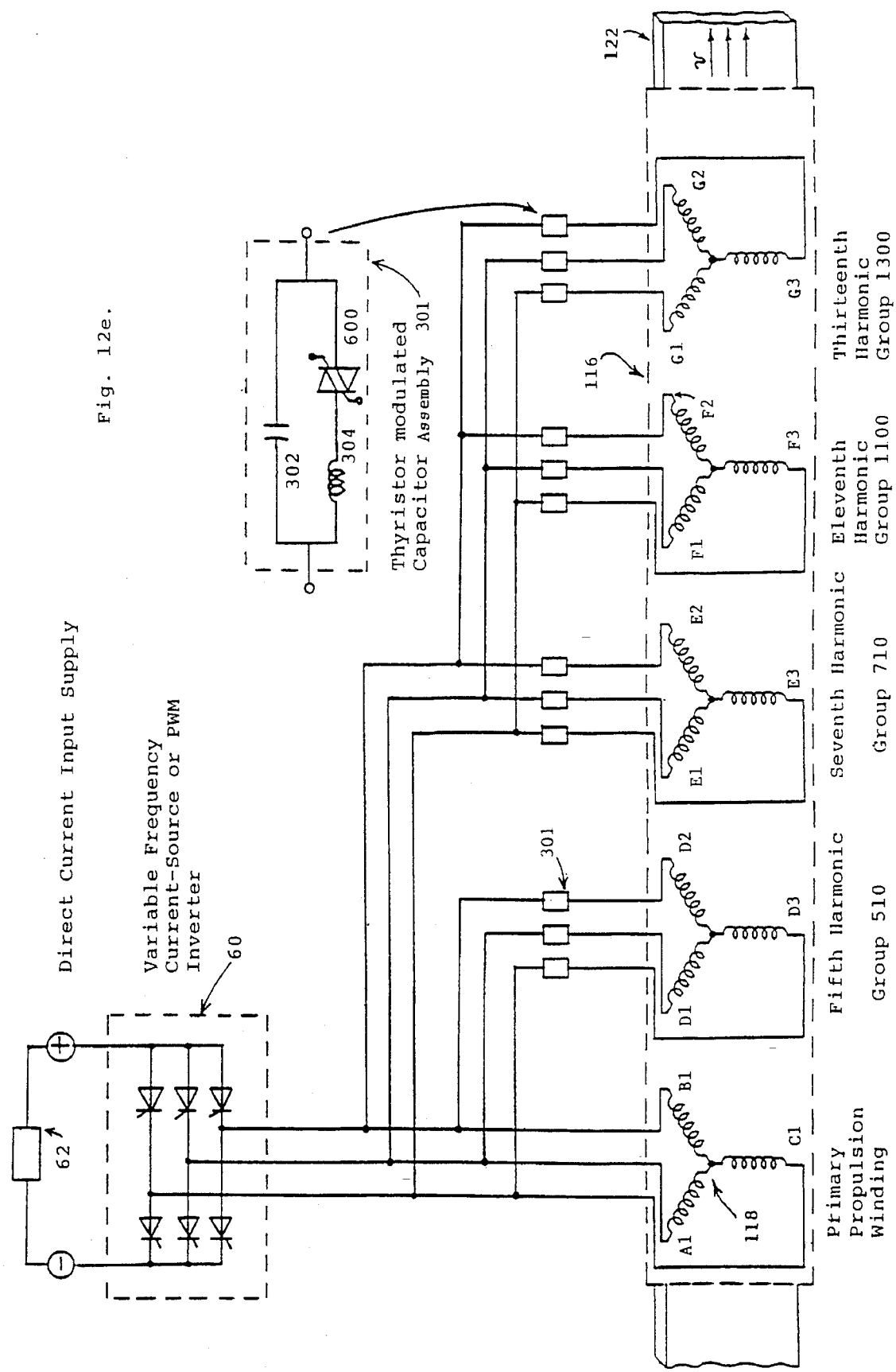

FIG. 12e shows a system layout incorporating variable frequency inverter 60 fed from DC supply 62 and powering in parallel primary winding 118 and tertiary harmonic current filters 510, 710, 1100 and 1300. Reaction rail 122 is shown moving in a forward direction at velocity V, where it is essential to note the spatial location of the five different stator coil groups in this arrangement. The change in pole pitch is denoted by the symbols at the respective windings. In an alternate embodiment of the invention, tertiary groups 710 and 1300 may be delta-connected on the basis that groups 510 and 1100 remain wye connected. This will alter the response of the system to filtering third and sixth harmonic currents, which are not, in general, high for this type of inverter with stepped-square wave output and six thyristor switching elements. It is preferable that the DC input source 62 be of the constant-current type or have a series input inductor to assist in thyristor commutation in 60 and output current regulation to the LIM.

The advantage of this magnetic filtering scheme over conventional static capacitor schemes is that with the described invention, it is less costly to mach the filter requirements over the entire range of speed/inverter frequencies in linear motor propulsion systems driven by variable frequency current-source inverters with voltage output proportional to frequency output. The static capacitor filtering schemes are by nature only exactly appropriate at one frequency and voltage level and require complex switching systems if used over a broad frequency range. The described system uses the non-resonant capacitor to cancel the tertiary winding slot-leakage reactance or mechanism occurs by virtue of the reactive power transfer to the airgap flux. Consequently, the kVAR rating of the tertiary control capacitors 502, 702, 302 and 800 is approximately one-tenth of the size of a standard electrostatic capacitor as used in conventional motion-drive systems with square wave or current-source inverter output.

TABLE II

Specifications for 9-Pole Single-Sided Linear Induction Motor with Four Stage Harmonic Current Filtering Windings for Use with Six-Pulse or Twelve-Pulse Variable Frequency Solid-State Inverters in 0–300 mph Propulsion System

| | |
|---|---|
| Primary Winding: Double-layer, lap, wye | 9 Poles |
| Apparent Power Input Rating | 4500 kVA |
| Pole Pitch | 0.536 m |
| Slots per pole per phase | 4 |
| Applied Frequency at 300 mph (134 m/s) | 138 Hz |
| Stator Transverse Width | 0.311 m |
| No. of Coils (Ref. FIG. 12a, 12b) | 108 |
| Chording | 8/12 |
| Airgap | 2.85 cm |
| Core Depth | 8.57 cm |
| Slot Depth | 3.81 cm |
| Back-iron depth | 4.76 cm |
| Length of Primary | 4.82 m |
| Power Output @ 300 mph | 5,000 HP |
| Thrust | 37,000 N |
| Slip at Rated Thrust | 11% |
| Rated Current/phase | 1800 A r.m.s. |
| Fifth Harmonic Tertiary Winding: | 2 Poles |
| Pole Pitch | 10.7 cm |
| Slots/pole/phase | 2 |
| Applied Frequency at 300 mph | 690 Hz |
| Length of Fifth Harmonic Section | 0.214 m |
| Tertiary Leakage Inductance @ 5 turns/coil | 7.33 uH |
| Off-Resonant Series Capacitor C5 (502) | 1472 uF |
| Seventh Harmonic Tertiary Winding: | 2 Poles |
| Pole Pitch | 7.65 cm |

TABLE II-continued

| | |
|---|---|
| Slots/pole/phase (Ref. FIG. 12c) | 2 |
| Applied Frequency at 300 mph | 966 Hz |
| Length of Seventh Harmonic Section | 18.5 cm |
| Tertiary Leakage Inductance @ 4 turns/coil | 4.69 uH |
| Off-Resonant Series Capacitor C7 (702) | 1173 uF |
| Eleventh Harmonic Tertiary Winding: | 2 Poles |
| Pole Pitch | 4.87 cm |
| Slots/pole/phase (Ref. FIG. 12d) | 2 |
| Applied Frequency at 300 mph | 1518 Hz |
| Tertiary Leakage Inductance @ 3 turns/coil | 2.64 uH |
| Off-Resonant Series Capacitor C11 (800) | 864 uF |
| Thirteenth Harmonic Tertiary Winding: | 2 Poles |
| Pole Pitch w. 7/6 chording | 4.12 cm |
| Slots/pole/phase (Ref. FIG. 12d) | 2 |
| Applied Frequency at 300 mph | 1794 Hz |
| Tertiary Leakage Inductance @ 2 turn/coil | 1.17 uH |
| Off-Resonant Series Capacitor C13 (302) | 1371 uF |

TABLE III

Figure 19:
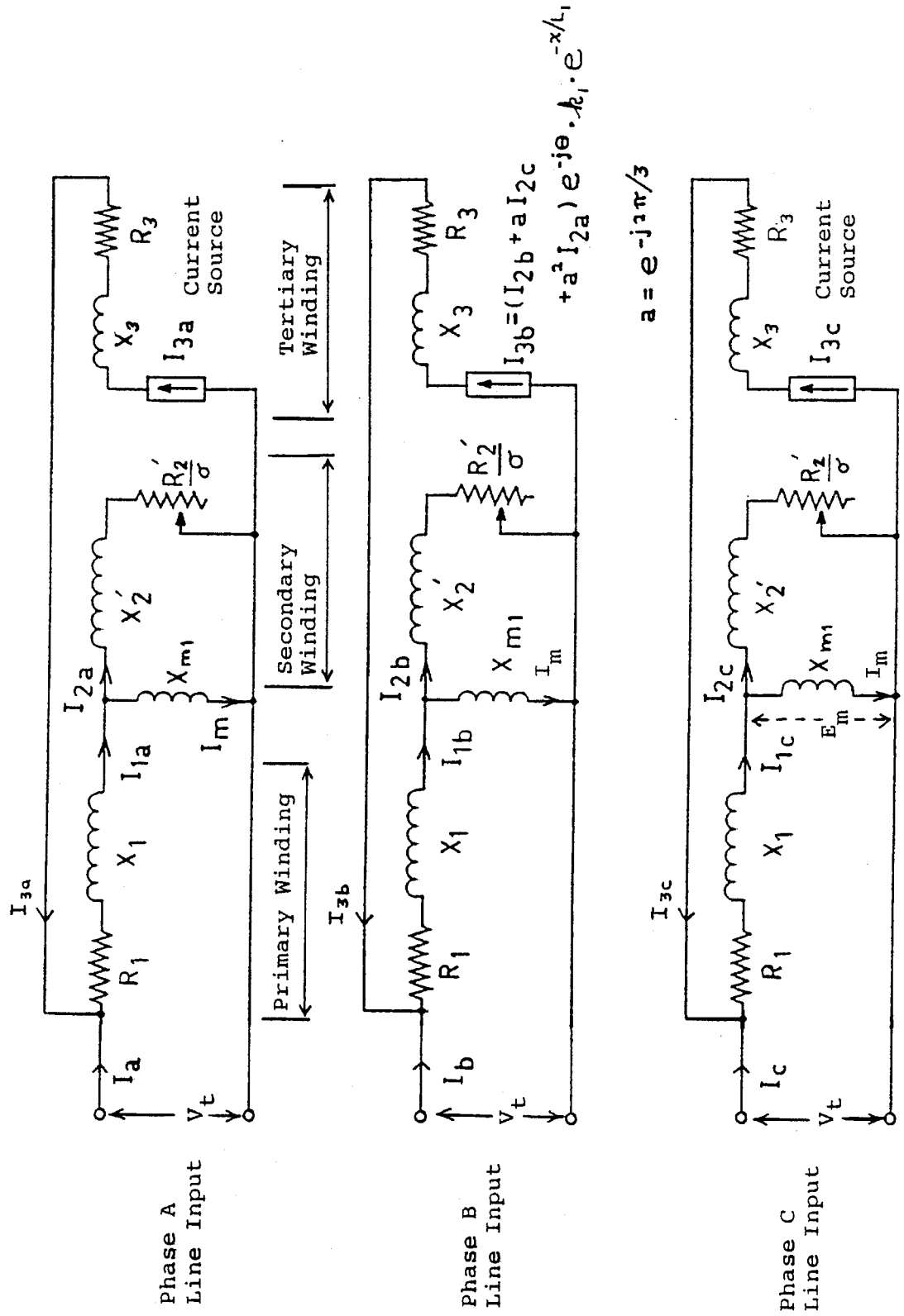
FIG. 19 is the electrically equivalent circuit of the described invention relating to the phasor diagram of FIG. 20.

Equivalent Circuit Parameters corresponding to the Power Factor Compensated LIM Phasor Diagram of FIG. 19. All Values Calculated at 138 Hz as appropriate to 300 mph propulsion motor with 0.536 m pole pitch

| | |
|---|---|
| Primary Resistance, R1 | 0.297 Ohm |
| Primary Leakage Reactance, X1 | 1.04 Ohm |
| Magnetizing Reactance, Xm | 14.7 Ohm |
| Secondary Leakage Reactance, X2' | 0.08 Ohm |
| Secondary Rail Resistance, R2' | 0.35 Ohm |
| (R2' and X2' values are referred to primary) | |
| Tertiary Leakage Reactance, X3 | 0.30 Ohm |
| Tertiary Phase Resistance, R3 | 0.086 Ohm |
| Magnetic Reynolds Number, G | 42 |
| Space attenuation constant, L1 | 6.377 m |
| Tertiary Current Source Coupling Factor k1 | 0.88 |

The machines just described exemplify designs embodying the invention that are applicable to 15+-pole short-stator linear motors, with solid reaction rails. Other pole distributions, e.g. 12-3+ for a 15-pole machine could be used but care must be taken to avoid magnetic imbalance leading to mechanical stress.

Clearly some modification may be required for other motors.

It should be noted that the ASC winding will be appropriate only for a particular narrow range of slip, but this may be designed to be anywhere in the wider range 0.25 per unit motoring to 0.25 per unit braking. Also the peak performance may be obtained at other than exactly at supply frequency but this discrepancy will be small and performance is not very dependent on small changes of frequency over this range.

The machines described have solid or fabricated-ladder-style reaction rails but clearly a wound or ladder-type reaction rails can be used with advantage for the same reasons as wound rotors are used on conventional induction machines, in some circumstances, especially when high starting thrust is desired. The invention can advantageously utilize a reaction rail which either progressively or abruptly changes in electrical resistivity as a function of longitudinal dimension to produce optimum thrust characteristics versus speed.

Figure 13:
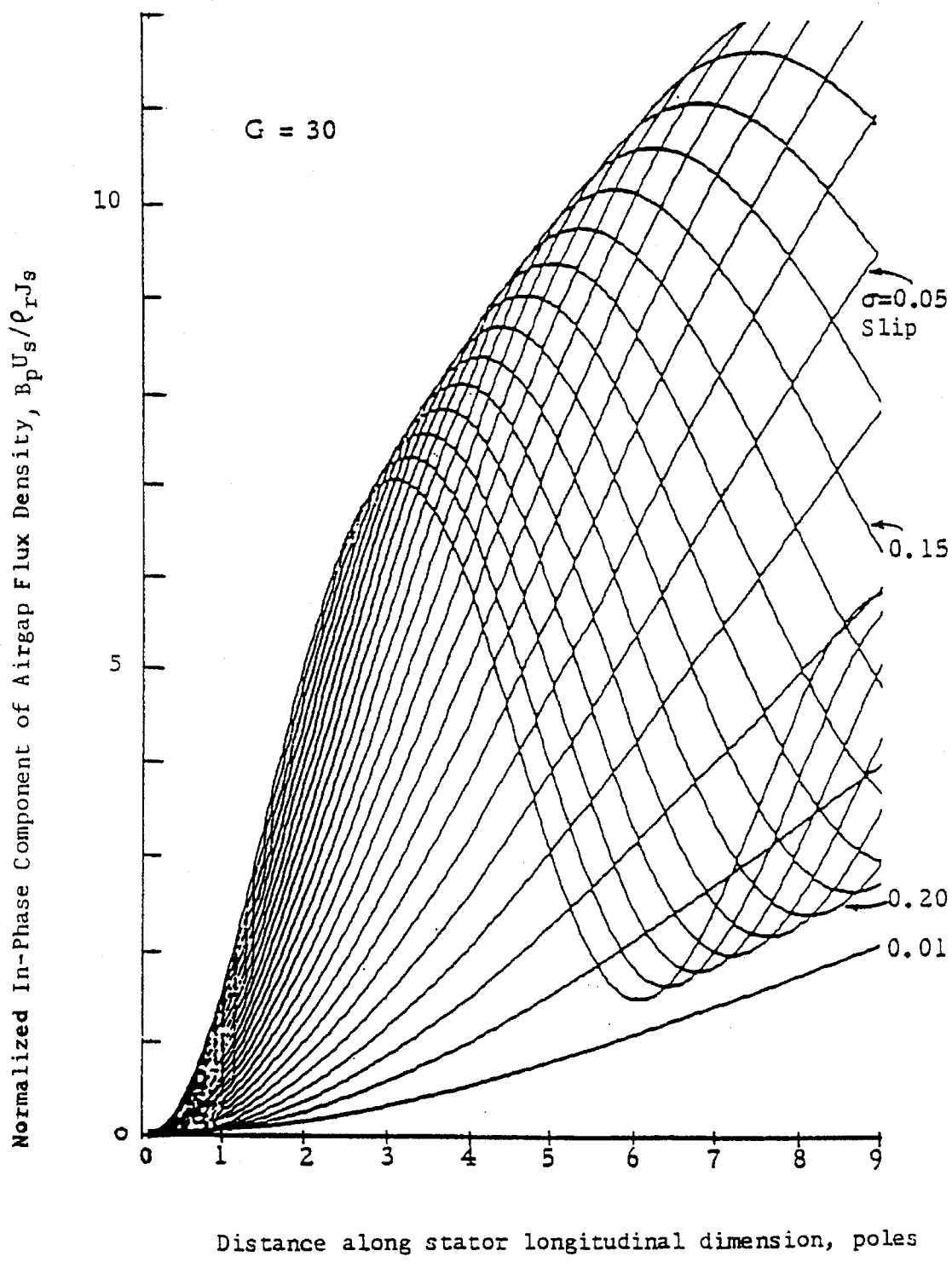
FIGS. 13 and 14 show parametric curves for describing the behavior of LIMs with exit-edge compensation such as are shown in FIGS. 9, 10a and 10b.

FIG. 13 is a curve of normalized in-phase component of airgap magnetic flux density $B_p U_s/P_r J_s$ for a spatial flux component perpendicular to the LIM stator surface. The family of slip curves is for $\sigma=0.01$ to $\sigma=0.25$ per unit showing oscillating characteristic at high slip values and for pole locations up to 9 poles. The G=30 magnetic Reynolds number represents a finite magnetization of a 10–100 kVA size LIM.

The Reynolds number is a well known parameter by which the overall performance of electrical machines can be compared, calculated as:

$$G = 2T_p^2 \mu_o f \, t/P_r \pi g_e$$

where $T_p$ = pole pitch
t = reaction rail conductor thickness
$\mu_o$ = free space permeability
$P_r$ = reaction rail resistivity
f = excitation frequency
$g_e$ = effective primary to secondary airgap FIG. 13 represents prior art and a uniformly-wound single-primary stator.

Figure 14:
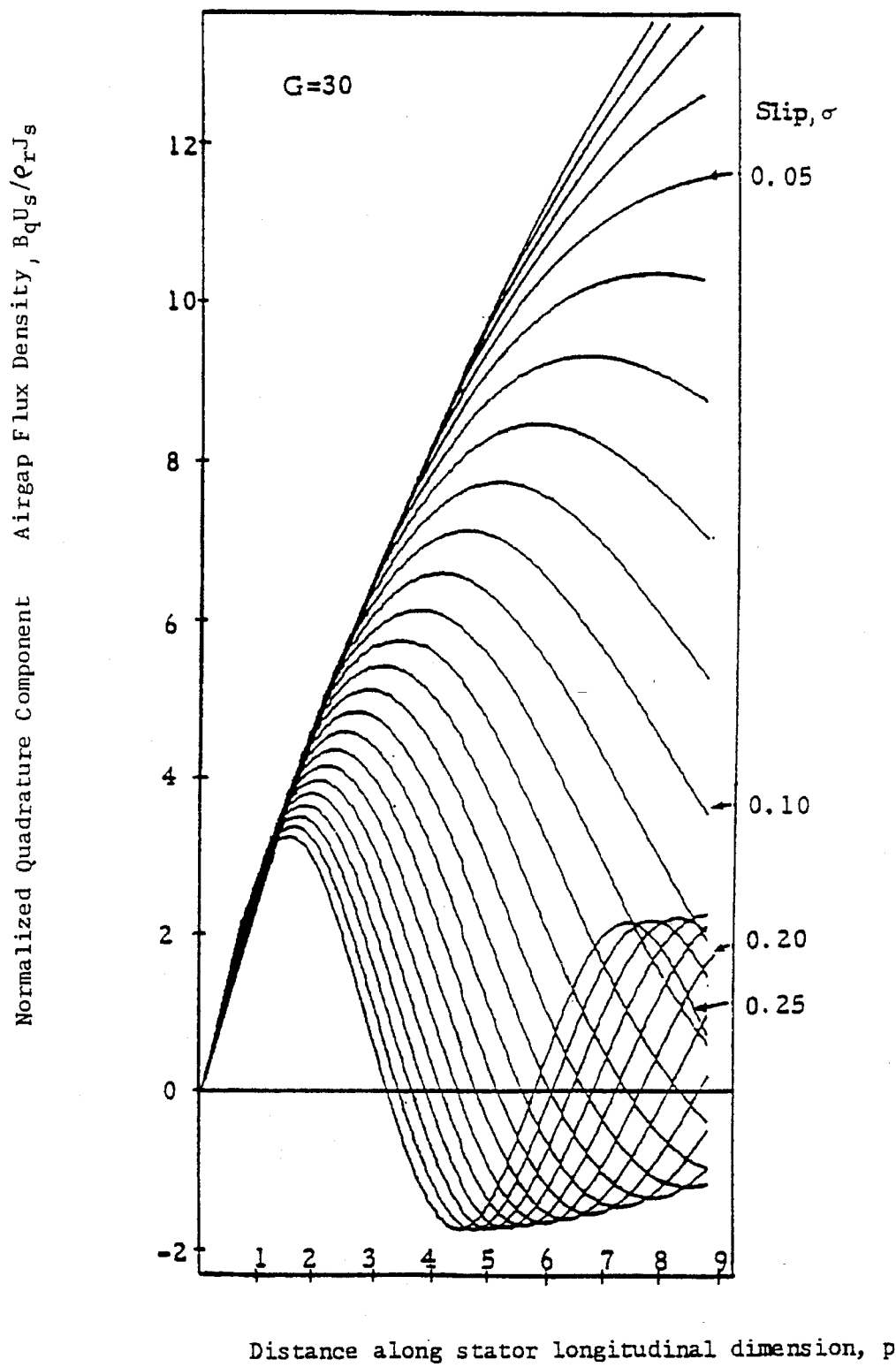

FIG. 13 demonstrates an important characteristic of embodiments of some aspects of the invention, particularly those using selected phase displacement technique. FIG. 13 is a plot of the spatial envelope of in-phase airgap flux density for the propulsion machine parts of FIGS. 8 and 9. The primary winding portion 80 of FIGS. 8a or 8b can be identified in FIG. 13 as the horizontal axis is calibrated in unit poles from entry-edge of the propulsion block. FIG. 13 also applies to the first propulsion primary block 88 in FIG. 9 which starts at coil No. 1 and continues for 5 poles. The total value for magnetic flux density $B_T$ is given by $(Bp^2 + Bq^2)^{1/2}$ i.e. the vector sum of the in-phase (Bp) and quadrature (Bq) flux. The plot is valid for a per unit slip(s) between zero and 0.20. FIG. 14 represents the matching curve to FIG. 13 for the quadrature component of airgap flux density and a uniform-wound single primary without incorporation of an asynchronous condenser winding but showing the production of a small negative amount of quadrature flux density but not sufficient to produce a machine with overall net negative reactive power. This represents prior art technology of LIMs. FIG. 14 applies to primary member 80 in FIGS. 8a and 8b and to primary member 88 in FIG. 9 but without exit-edge compensation.

These relationships establish the necessary starting conditions to permit application of the invention, to linear induction motors in that by controlling the minimum value of the quadrature flux density (Bq(min)) at the edge of the primary zones 88, 90, 92 in FIG. 9, hence the pole pitch of the transient travelling wave resulting from the recovery pole winding portion (Ref. 82, 84, 86 in FIG. 9) can be adjusted between Tp and (1–s)Tp. In this way change in electrical angle phase with slip variation can be accommodated to maximize the negative integral of Bq with longitudinal distance. It is an important advantage and advance of the invention that this phase change can be achieved solely by winding design if required.

The techniques described above show that by departing from the well-established conventional form of machine construction in which the stator windings are regular and symmetrical and by introducing a form of the winding to produce operation under spatially transient electromagnetic conditions the performance of the machine in terms of power factor or efficiency, or both, can be improved. Such modified machines can be very suitable for variable speed drive from an inverter in that harmonic filtering can be provided by the winding form, avoiding the existing requirement for an associated synchronous condenser machine or external capacitor bank.

It is known that machines have been proposed with discontinuous or nonuniform windings produces by changing the position of some coils to slots other than those indicated by a regular layout. However these proposals have been directed only at mitigating the "end effects" such as the "back torques" mentioned above when a reaction rail emerges from a stator field and attempts to make the end parts of the winding look like part of a continuing winding or provide a smoother transition to a lower flux value. The term machine used herein clearly includes generators and motors.

Figure 15:
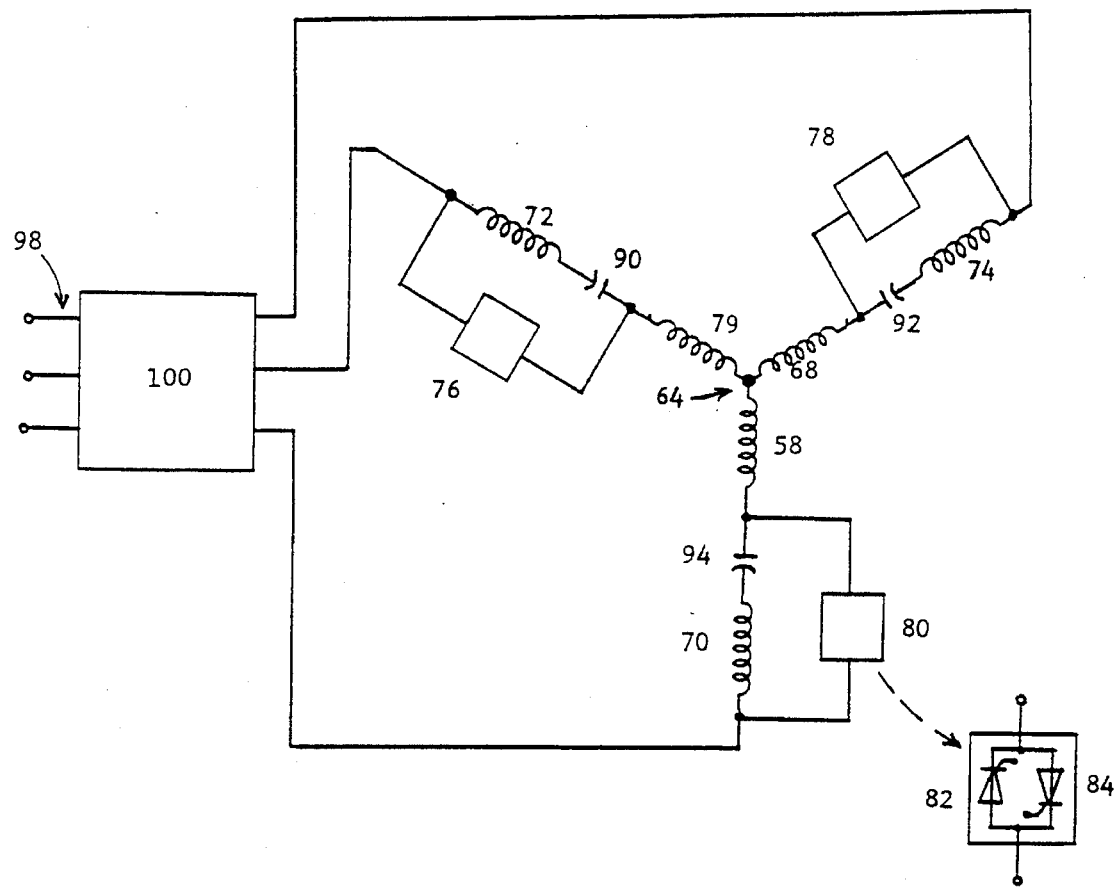
FIG. 15 shows an embodiment of the invention with asynchronous condenser windings in series with the primary winding of a LIM.

FIG. 15 is an alternate version of the apparatus shown in FIG. 7c whereby the asynchronous condenser windings 70, 72, 74 are placed in series with LIM propulsive windings 58, 79, 68 with interconnected series capacitors 94, 90, 92, respectively. Each phase has a shunt regulator 80, 76, 78 which is permanently in parallel with the asynchronous condenser-capacitor pairs and provides current and/or voltage regulation of the ASC by either phase-delay or phase chopping action. Each shunt regulator has bilateral switching elements 82 and 84 which have ability to be triggered at selected phase angles in the waveform and to turn-off prior to natural current zero. The polyphase input supply line 98 is connected to a variable-voltage/variable-frequency power converter 100 which is controlled in accordance with the vehicle speed command, level of motor magnetic flux and the optimum operating slip of the LIM for reducing end-effects or maximizing terminal power factor. This is a preferred embodiment for high-voltage, high-power propulsion systems whereby it is desirable to have the asynchronous condenser windings in resonance or partial-resonance with an electrostatic capacitor and after zero net impedance as a series circuit to the propulsive windings; this scheme being advantageous where it is necessary to produce a zero exit-edge effect and zero drag on the primary structure while retaining unity power factor at the converter 100 terminals and minimizing the input kVA draw at the source line 98.

Figure 16:
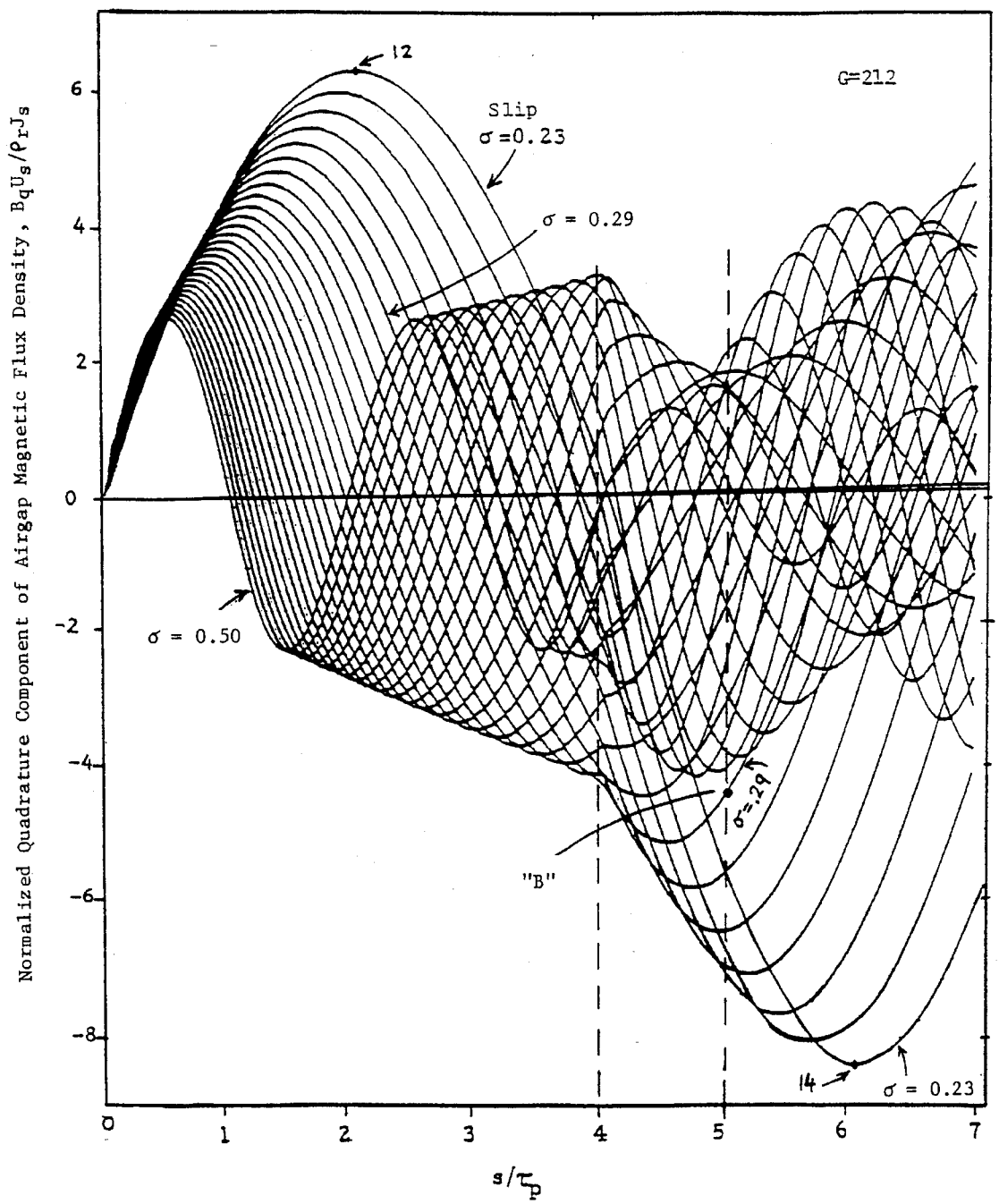
FIGS. 16 and 17 are parametric curves for quadrature-axis and direct-axis airgap flux components for a LIM with preferred embodiment showing a primary and tertiary winding, the latter used for control of reactive power.

FIG. 16 is specific to the invention described herein and shows the characteristic curves of the time quadrature component of airgap magnetic flux density, $B_q$ normalized with respect to the product $U_s/P_rJ_s$ where $U_s$=synchronous mechanical speed, $P_r$=resistivity of the secondary conductor, $J_s$=stator or primary currently loading in Ampere-turns per meter longitudinal. This is the normal component of airgap flux density, i.e. the component which is spatially oriented perpendicular to the flat surface of the linear motor face. The horizontal axis is the longitudinal position expressed as distance, s divided by stator pole-pitch, $\tau_p$ from the entry edge of the stator block. The family of curves are plotted for slip $\sigma$=0.23 to $\sigma$=0.50 per unit. The 0.23 p.u. slip is a typical operating slip for a linear induction motor when in the acceleration mode. The chart includes the special case where the primary has conventional excitation for poles 0 to 4 and then from poles 4 through 7, the stator block is additionally wound with an asynchronous condenser winding which has a peak current loading magnitude, $J_{s2}$ of one-half the value of the primary loading, $J_{s1}$ and reverse-phased, i.e. $J_{s2}$=−0.5 $J_{s1}$ and this is superimposed on the conventional primary excitation. It is this reverse phasing and particular slip/pole combination which results in the machine having a net negative (or leading) airgap reactive power. Label 12 is the peak positive value at $B_qU_s/P_rJ_s$=6.25 per unit for section 1. Label 14 is the peak negative value at −8.88 per unit for section 2. At this particular slip, both section 1 and section 2 have the same period of oscillation, which is 4 poles=180°.

The reactive power input, Q from the line or source is calculated over the total pole-pitches $\tau_{pt}$ as:

$$Q = \int_o^{Tpt} Bq \times Jsds = \int_o^{4\tau p} Bp \times Jsds + \int_{4\tau p}^{8\tau p} Bq \times Jsds$$

per unit 1.0 meter active width of stator surface $$Q = \frac{\tau p}{\pi} \left[ \int_o^{\pi} 6.25 \frac{PrJs^2}{u_s} \sin\theta d\theta - \int_{\pi}^{2\pi} 8.88 \frac{PrJs^2}{u_s} \sin\theta d\theta \right]$$

$$Q = -1.67 \frac{\tau p}{\pi} \frac{PrJs^2}{u_s}$$

Substituting values typical of a multi-megawatt LIM with a 9.5 mm thick aluminum secondary conductor and a 150 m/s synchronous speed to yield a 300 mph propulsion system.
Resistivity: $P_r$=(3.25×10$^{-8}$ ohm-m)/0.0095=3.42×10$^{-6}$ ohm
Current Loading: $J_s$=50×10$^3$ a/m
Synchronous Speed: $U_s$=150 m/s
Pole-pitch: $T_p$=0.20 m
$P_rJ_s^2/U_s$=57.0

Q=−1.67 (0.0637)[57]=−6.065 VAR per 1.0 meter of active surface width

That is, the machine is drawing leading reactive power from the source; this represents an advancement over the prior art and a condition never attained before with induction machinery of conventional, uniformly-wound primary excitation members. It is understood that the net negative airgap reactive power can be used to offset the positive reactive power required for slot leakage reactance, end-winding reactance and phase-phase belt leakage reactance to yield an overall higher or unity power factor at machine terminals.

Figure 17:
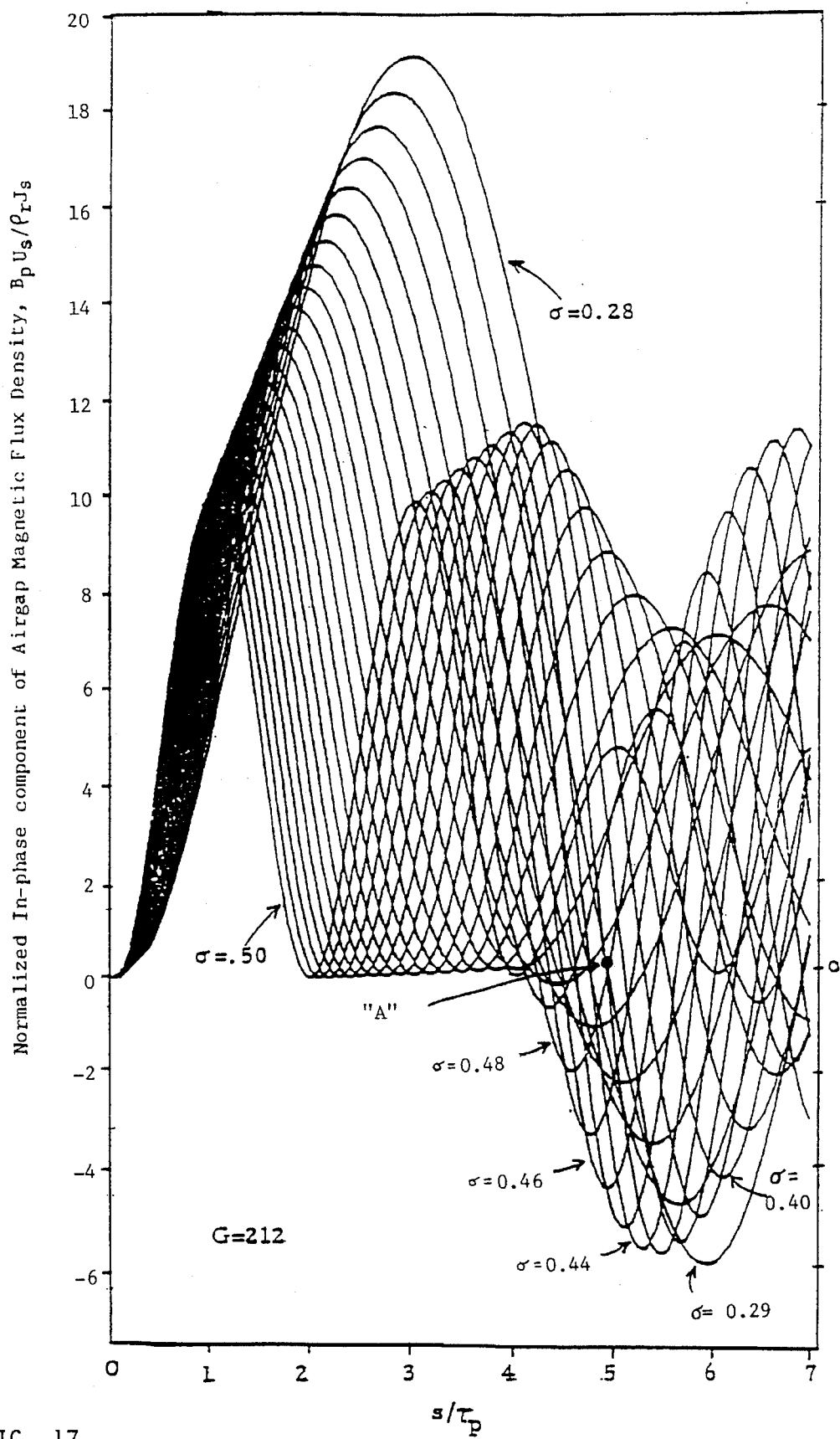

FIG. 17 is the in-phase component of airgap magnetic flux density, $B_p$ normalized with respect to the quantity $U_s/P_rJ_s$ and representing the spatial component oriented perpendicular to the machine surface. The family of curves are plotted for slip $\sigma$=0.28 to 0.50 per unit. The chart includes a special case where the primary has conventional excitation for poles 0 to 4. From poles 4 through 7, the stator block is wound with the asynchronous condenser winding which has a peak current loading magnitude $J_{s2}$ of one-half the value of the primary loading, $J_{s1}$ and reversed phased $$J_{s2} = -0.5\ J_{s1}$$

superimposed on the primary excitation continuing to the end of the block, i.e., at the exit-end. This produces a negative $B_p$ characteristic in the region s>4 $\tau_p$ for slip values of 0.49 p.u. or smaller which indicates that a small drag force is present in section 2. However, the net power produced is the integral:

$$P = \int_o^{Tpt} Bp \times Jsds$$

where $\tau_{pt}$ is the total number of stator poles.

Consider the case of $\sigma$=0.29 slip. If the stator block is terminated at s=5 $\tau_p$, then $B_p$ curve remains positive at all locations and crosses the horizontal axis (zero line) at point "A" as indicated in FIG. 17. Thus, there is no drag force whatsoever for a stator block of 5 poles length when at $\sigma$=0.29 p.u. This is a specific optimum operating point when the magnetic Reynolds number is G=212.

Reference FIG. 16 for the corresponding $B_q$ quadrature axis characteristic for σ=0.29 p.u. at the s=5 $τ_p$ location; this is denoted by "B" which has a value $B_q$=–4.5 per unit. If the integral ∫$B_q J_s$ds is taken over 5 pole-pitches, the net value is negative indicating leading power factor while zero drag force is obtained. This constitutes the basis of the invention.

Figure 18:
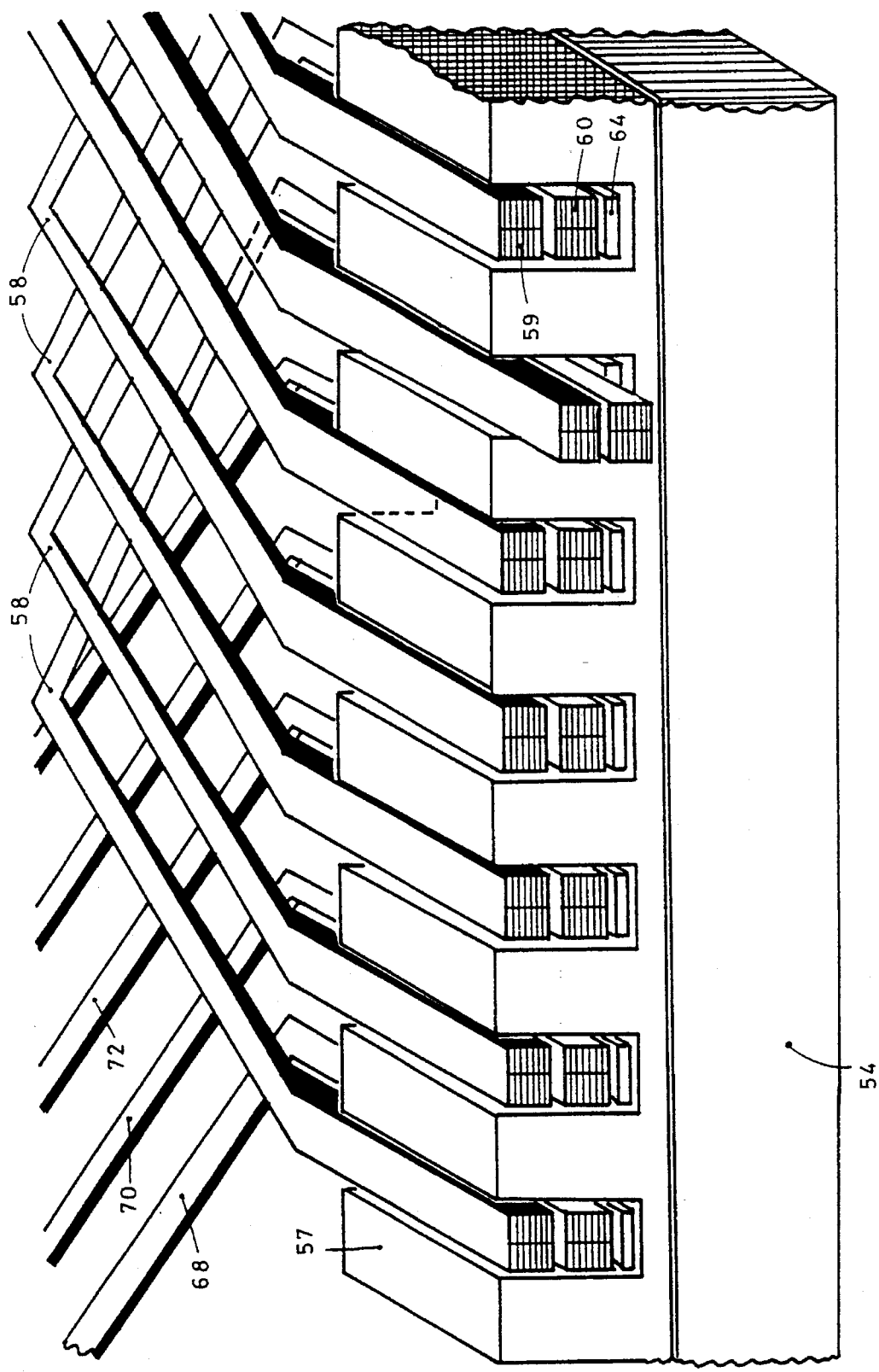
FIG. 18 is a schematic representation of a superconducting winding with non-ferromagnetic stator teeth and ferromagnetic stator yoke.

FIG. 18 shows a representation of a superconducting linear induction machine with superconducting primary coils 68, 70, 72 and tertiary coils 58 imbedded among non-ferromagnetic stator teeth 57 and utilizing ferromagnetic stator core 54.

Figure 20:
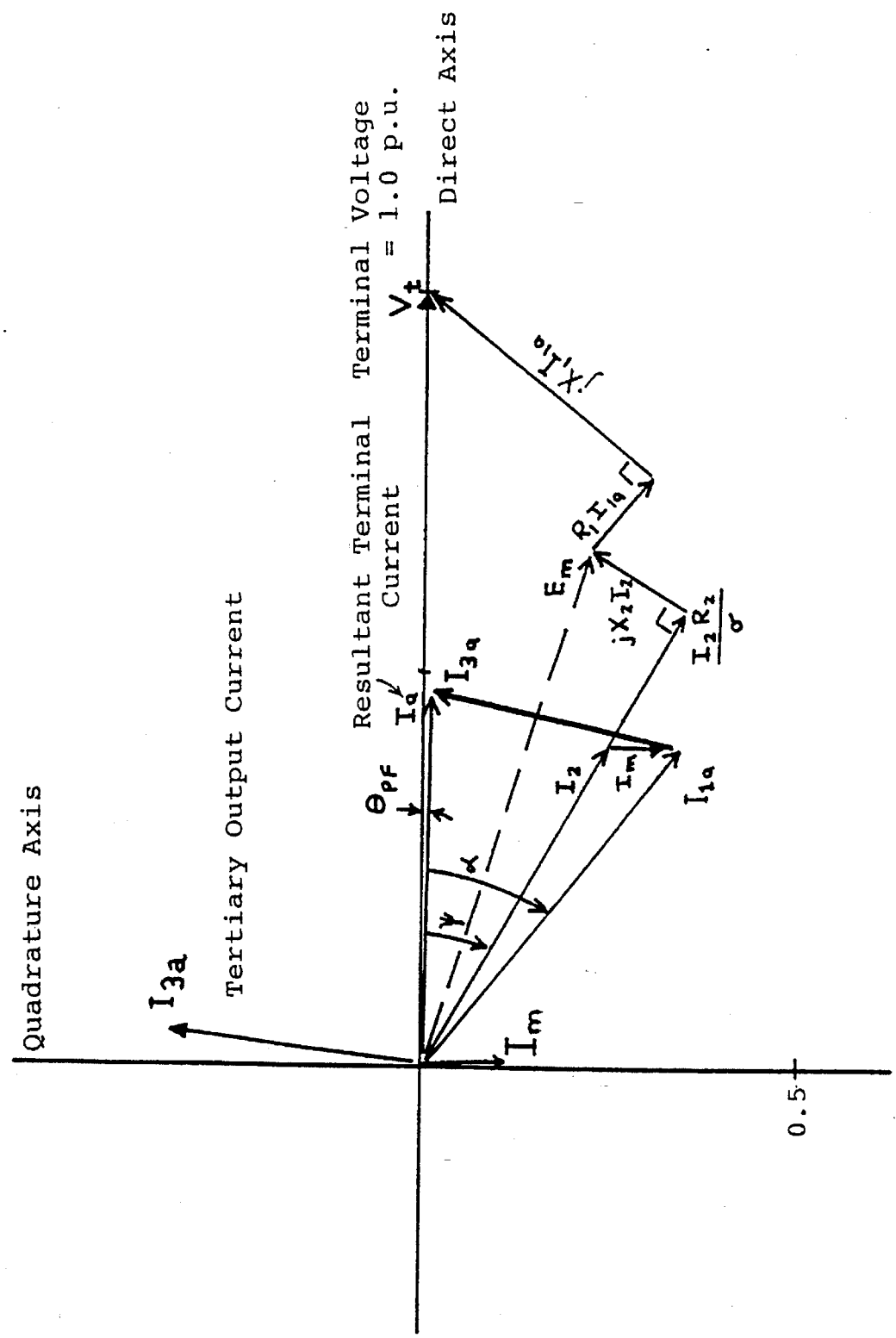
FIG. 20 shows a phasor diagram of the present invention.

FIG. 19 is the electrical equivalent circuit of the described invention relating to the phasor diagram of FIG. 20 and for the specific case of a propulsion mode at high speed.

FIG. 20 shows a phasor diagram of the described invention for the component voltage drops for leakage inductance, magnetizing inductance, airgap EMF and primary and tertiary current phase angles, drawn for the high speed condition in a propulsion mode.

Figure 21:
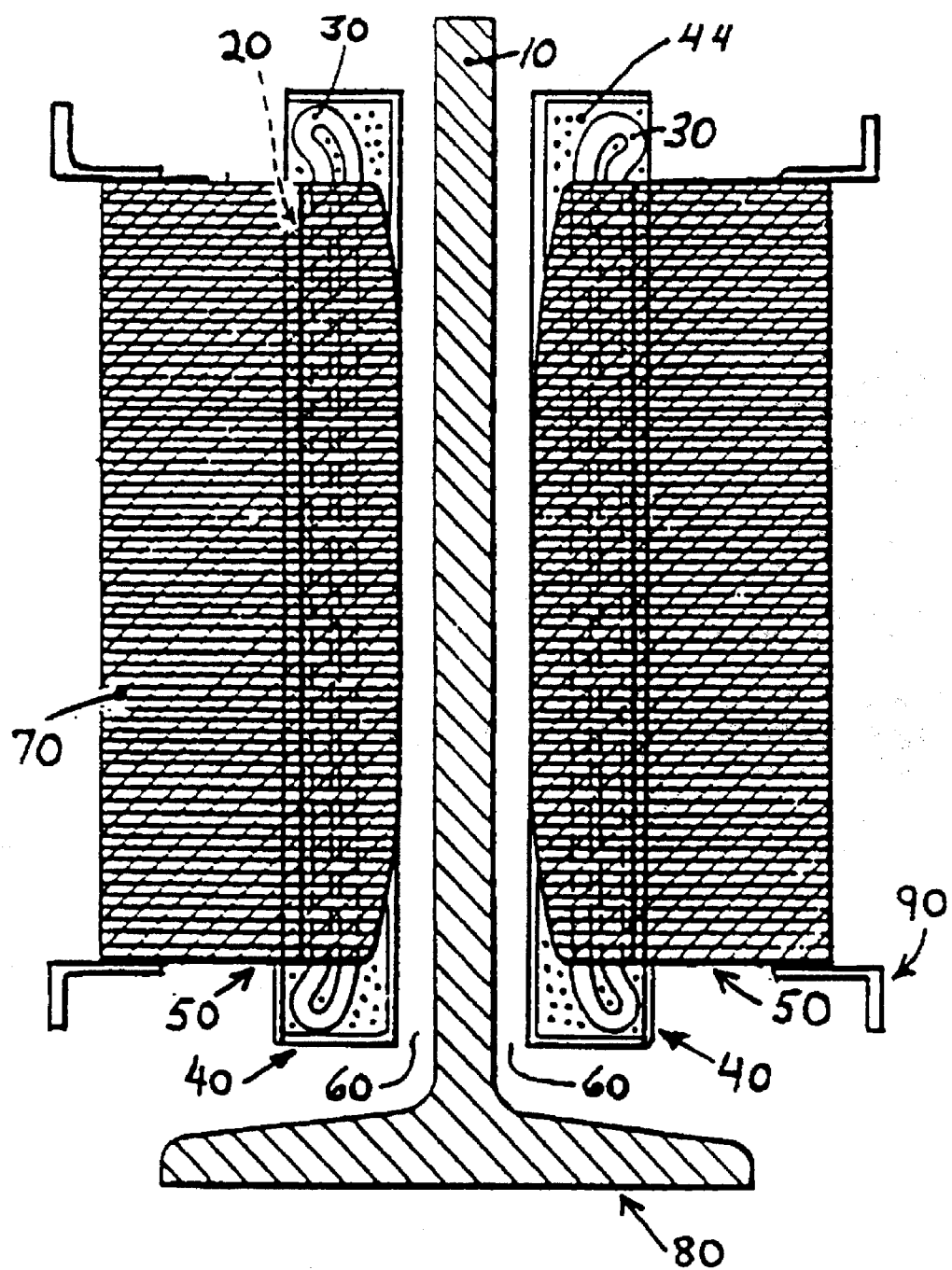
FIG. 21 shows a cross section of a double-sided superconducting LIM with a solid conductive reactive rail.

FIG. 21 shows a cross section of a double-sided superconducting LIM with solid conductive reactive rail 10. The stator windings 30 are located in non-ferromagnetic slots 20 and mechanically supported by magnetic return ferromagnetic structure 70 which is a laminated steel member. The laminations are compressed and positioned by structural finger-plate 50. Stator coils are composed of superconducting tape or wire and arranged in lap-wound coils 30 on both sides of airgap 60. The stator coils are enclosed by cryostat 40 which is filled with a liquid or gaseous cryogen 44. All components contained in cryostat 40 are non-ferromagnetic. The cryostat may be composed of an alloy such as stainless steel, inconel, titanium or a composite material. The reaction rail is fastened to the ground or supporting structure at location 80. The stator assembly is usually fastened to the vehicle or moving object at location 90.

Although the invention has been described in detail in the foregoing embodiments for the purpose of illustration, it is to be understood that such detail is solely for that purpose and that variations can be made therein by those skilled in the art without departing from the spirit and scope of the invention except as it may be described by the following claims.

What is claimed is:

1. An alternating current linear electrical machine having a first winding and a second winding both of electrically conductive material and supported for relative motion with a flux-permeable gap between them, one winding being arranged to create and maintain along the gap at least one transient to different electrical and/or magnetic field conditions across the gap, without requiring a change in the frequency of the alternating current applied to the machine, the arrangement being such that in operation with said relative motion of the windings the transient to different conditions results in a change of effective field speed along said gap and the first and second windings there interact to produce in the one winding negative reactive volt amperes.

2. A brushless electrical machine according to claim 1 having as a first winding a wound uniformly slotted stator and as a second winding a wound uniformly slotted stator and as a tertiary winding an electrically conductive reaction rail, the stator winding including one part wound to one pole pitch and another part wound to a shorter pole pitch to provide in operation a stator field pattern decelerating with respect to the reaction rail when moving from the longer towards the shorter pole pitch past that part of the stator.

3. An electrical machine according to claim 1 in which additionally a modification of the first winding is arranged to provide a modified phase relation between poles.

4. An electrical machine according to claim 1 in which the number of turns per coil and therefore magnetomotive force (MMF) is varied in a step-like fashion in at least one of the windings.

5. An electrical machine according to claim 3 including spaced along a linear machine stator at least one transient-creating pole, magnetic discontinuity or partial-pole winding arranged to control by the quadrature flux components the effective width of a region of transient electromagnetic conditions.

6. An electrical machine system including a machine according to any one of the preceding claims providing therein an asynchronous condenser winding of the machine arranged to recover said negative reactive power during the operation of the machine.

7. A system according to claim 6 including an inverter to supply alternating power at a fixed or variable frequency, the asynchronous condenser winding permitting operation with reactive power available at the load or propulsion machine terminals despite the inability of the inverter to provide reactive power.

8. A system according to claim 6 wherein the asynchronous condenser winding providing in combination with appropriate reaction rail inertia and thermal mass a filter for unwanted harmonics of current in the system.

9. A system according to claim 7 wherein the asynchronous condenser winding providing in combination with appropriate reaction rail inertia and thermal mass a filter for unwanted harmonics of current in the system.

10. A stator for a linear induction motor having a reaction rail which is backed by a flux-return member comprising:

a first slot portion of uniform pitch and made of a electromagnetic flux return path and source of primary excitation; and a second slot portion having a shorter uniform pitch than the first slot portion, said second slot portion integrally connected to the first slot region and made of a reducing iron section which provides for a magnetic return path section extending from the constant iron section of the first slot portion so exit-edge loss is eliminated.

11. A stator for a linear induction motor having a reaction rail which is backed by a magnetic-flux-return member comprising:

a first slot portion of uniform slot pitch and made of a constant iron section which provides an electromagnetic flux return path and source of primary excitation; and a second slot portion having a non-uniform slot-pitch which is constructed to permit a continuous decrease in pole-pitch with respect to the first slot portion causing a decelerating secondary field speed to occur, said second slot portion integrally connected to the first slot region and made of a reducing iron section which provides for a magnetic return path section extending from the constant iron section of the first slot portion so exit-edge loss is eliminated or attenuated.

12. An electrical machine according to claim 1 having as a first structure a stator wound with a liquid or gaseous cooled electrical conductor to form the primary electrical member and as a second structure a stator wound with superconducting wire or tape to form the tertiary electrical member and an electrically conductive reaction rail forming the secondary electrical member, the stator winding including primary electrical member wound to one pole-pitch nearest the entry side of the machine and tertiary electrical member wound to a shorter pole-pitch nearest the exit-end of the machine to provide in operation a stator field pattern decelerating in specific longitudinal regions of the airgap the speed of the traveling magnetic field with respect to the reaction rail when moving from the longer towards the shorter pole pitch past that part of the stator.

13. An electrical machine as in claim 12 with the provision that the primary electrical member is composed of superconducting wire or tape and is cooled by either a liquid cryogen or a gaseous cryogen to effect high current density in one or greater stator windings and to use the negative reactive volt-amperes produced by the tertiary electrical member for compensation of the machine overall power factor.

14. An electrical machine as in claim 12 with the provision that the electrically conductive reaction rail or secondary winding is composed of a superconductive bulk or wire material which results in low electrical loss characteristics at high current density and permits operation at an electrical slip value approaching zero when at partial or full mechanical propulsion load.

15. An electrical machine as in claim 13 whereby the stator is built of non-ferromagnetic materials for the purpose of operating the stator structure at magnetic field densities beyond the normal saturation characteristics of magnetic steel and thereby allowing very high force densities and a thrust versus primary current characteristic unaffected by magnetic saturation.

16. An electrical machine as in claim 13 whereby the stator is built of non-ferromagnetic materials for the purpose of operating the stator structure at magnetic field densities beyond the normal saturation characteristics of magnetic steel and thereby allowing very high stored energy in the airgap magnetic field and production of reactive current or reactive volt-ampere output power from the tertiary electrical member unaffected by magnetic saturation.

17. An electrical machine as described in claim 13 with the provision that only the stator yoke, comprising the return flux path contains laminated ferromagnetic material and the stator teeth contains a non-ferromagnetic of fiberglass/composite material for the purpose of allowing magnetic fields to exist in the airgap in excess of 1.2 Tesla with a minimum of eddy current and hysteresis losses in the stator core material and a terminal power factor approaching unity resulting from the production of negative reactive volt-amperes in the tertiary member.

18. An electrical machine as described in claim 4 whereby the tertiary electrical member has the higher magneto-motive force (MMF) on the machine stator and is wound with superconducting electrical conductors and the primary electrical member has the lower magneto-motive force on the stator wound with either a superconducting or normal conducting winding wherein a step-like change in ampere-turns occurs between primary and tertiary electrical members for the purpose of creating an auxiliary transient magnetic field with both forward and backward traveling waves.

19. An electrical machine as described in claim 4 whereby the auxiliary transient magnetic field aids the main traveling magnetic field for the purpose of boosting the in-phase component of magnetic flux near the entry zone of the machine resulting in a higher thrust density or higher specific output force than uncompensated linear machines.

20. An electrical machine as described in claim 4 whereby the auxiliary transient magnetic field acts in consort with the main magnetic field for the purpose of boosting the quadrature component of magnetic flux towards the exit-end of the machine resulting in production of negative reactive volt-amperes at specific longitudinal zones along the stator structure and a resultant improvement in terminal power factor over non-compensated linear induction machines.

21. An electrical machine as described in claim 19 whereby the auxiliary transient magnetic field acts in consort with the main magnetic field to simultaneously boost the in-phase component of magnetic flux and to boost the quadrature component of magnetic flux resulting in a decrease in the absolute value of exit-edge magnetic flux density, a decrease in the exit-edge electromagnetic drag and an enhancement in the terminal power factor at full and partial load conditions where at least one of the stator windings is wound with a superconducting wire or tape.

* * * * *